(12) United States Patent
Smith

(10) Patent No.: US 8,150,019 B2
(45) Date of Patent: Apr. 3, 2012

(54) PATH REDUNDANT HARDWARE EFFICIENT COMMUNICATIONS INTERCONNECT SYSTEM

(76) Inventor: Robert B. Smith, Loveland, CO (US)

( * ) Notice: Subject to any disclaimer, the term of this patent is extended or adjusted under 35 U.S.C. 154(b) by 213 days.

(21) Appl. No.: 12/672,877

(22) PCT Filed: Aug. 8, 2008

(86) PCT No.: PCT/US2008/072618
§ 371 (c)(1),
(2), (4) Date: Feb. 9, 2010

(87) PCT Pub. No.: WO2009/023563
PCT Pub. Date: Feb. 19, 2009

(65) Prior Publication Data
US 2011/0123014 A1    May 26, 2011

Related U.S. Application Data

(60) Provisional application No. 60/955,292, filed on Aug. 10, 2007.

(51) Int. Cl.
*H04M 3/00* (2006.01)
(52) U.S. Cl. ........ 379/243; 379/244; 379/248; 379/250; 379/330; 379/428.01
(58) Field of Classification Search ............... 379/26.01, 379/26.02, 220.01, 244, 248, 250, 330, 428.01; 370/337, 389
See application file for complete search history.

(56) References Cited

U.S. PATENT DOCUMENTS

| | | | |
|---|---|---|---|
| 3,993,871 A | 11/1976 | Hjortendal et al. | |
| 4,088,845 A | 5/1978 | Lalanne et al. | |
| 4,231,017 A | 10/1980 | Kiriyama | |
| 4,394,541 A | 7/1983 | Seiden | |
| 5,276,425 A | 1/1994 | Swanson et al. | |
| 5,408,231 A | 4/1995 | Bowdon | |
| 5,473,682 A * | 12/1995 | Tanaka | 379/372 |
| 5,495,476 A | 2/1996 | Kumar | |
| 5,644,115 A | 7/1997 | Knauer | |
| 5,812,549 A | 9/1998 | Sethu | |
| 5,881,059 A * | 3/1999 | Deschaine et al. | 370/337 |
| 6,049,578 A | 4/2000 | Senechal et al. | |

(Continued)

FOREIGN PATENT DOCUMENTS

WO    02/17469    2/2002

(Continued)

OTHER PUBLICATIONS

Clos, Charles "A Study of Non-Blocking Switching Networks" (1952): 406-424.

(Continued)

*Primary Examiner* — Joseph J Nguyen
(74) *Attorney, Agent, or Firm* — Santangelo Law Offices, P.C.

(57) ABSTRACT

A path redundant, hardware efficient communications interconnect (1) has embodiments that can present true any-to-any interconnect capability for first and second pathways (2) and (3) and can utilize double throw switches (25) with or without single throw switches (24) perhaps in staged collectives of sub arrays (4), (5), (6), (9), and (10). A loop-back communications interconnect (22) can be accomplished by an interleaved sub array (26). A quadrilateral center stage sub array (21) can be combined with asymmetric side stage sub arrays for hardware savings that are tenths of a percent of a traditional interconnect and even present eight fold savings over prior reduced hardware interconnects.

38 Claims, 11 Drawing Sheets

U.S. PATENT DOCUMENTS

| | | | |
|---|---|---|---|
| 6,542,599 B1 * | 4/2003 | Miyagawa | 379/221.03 |
| 6,594,261 B1 * | 7/2003 | Boura et al. | 370/389 |
| 6,696,917 B1 | 2/2004 | Heitner | |
| 6,754,208 B2 | 6/2004 | Kam | |
| 6,795,432 B1 | 9/2004 | Lee | |
| 6,901,071 B2 | 5/2005 | Lu | |
| 6,914,902 B2 | 7/2005 | Ayandeh | |
| 6,922,790 B2 | 7/2005 | Smith et al. | |
| 2002/0146003 A1 | 10/2002 | Kam | |
| 2003/0058848 A1 | 3/2003 | Dally | |
| 2003/0193938 A1 | 10/2003 | Ayandeh | |
| 2004/0017805 A1 | 1/2004 | Smith et al. | |
| 2004/0019816 A1 | 1/2004 | Smith et al. | |
| 2005/0111465 A1 | 5/2005 | Stewart | |
| 2005/0226551 A1 | 10/2005 | Olaf et al. | |
| 2005/0275504 A1 | 12/2005 | Torza | |
| 2006/0209816 A1 | 9/2006 | Li et al. | |

FOREIGN PATENT DOCUMENTS

| | | |
|---|---|---|
| WO | 2005125265 A2 | 12/2005 |
| WO | 2009023563 A1 | 2/2009 |

OTHER PUBLICATIONS

U.S. Appl. No. 60/955,292; entitled "True Any to Any Cross-Connect Matrix with Reduced Cross-Connect Element Count" filed Aug. 10, 2007.

International Application No. PCT/US2008/072618, International Search Report dated Nov. 19, 2008.

International Application No. PCT/US2008/072618, Written Opinion of the International Searching Authority Nov. 19, 2008.

International Application No. PCT/US2008/072618, International Preliminary Report on Patentability dated May 8, 2009.

* cited by examiner 25
24
SPST
SPDT
23
Fig. 5A  Fig. 5B
20  24  25
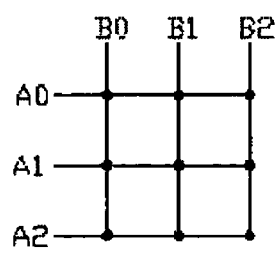
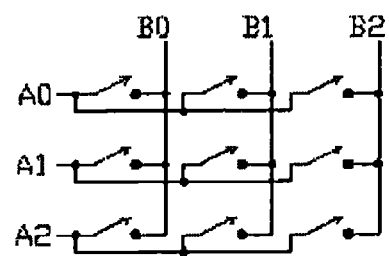
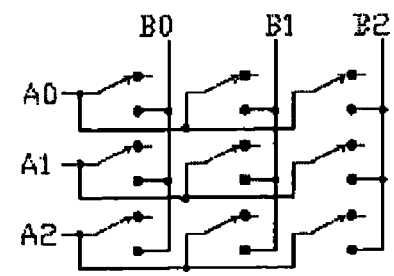
Fig. 6A  Fig. 6B  Fig. 6C

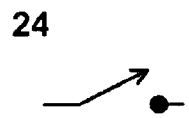 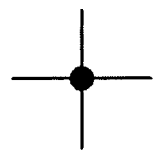
Fig. 7
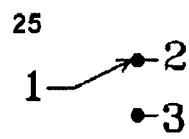 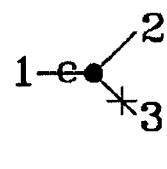 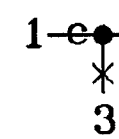 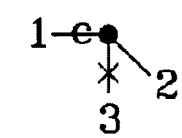 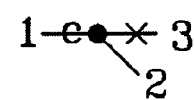
Fig. 8A  Fig. 8B  Fig. 8C  Fig. 8D  Fig. 8E
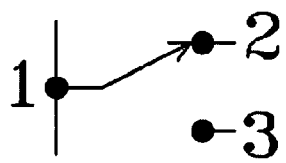 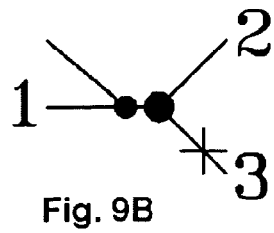
Fig. 9A  Fig. 9B

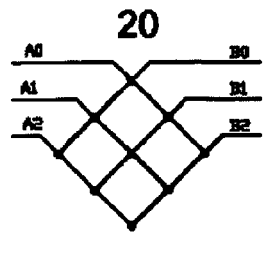 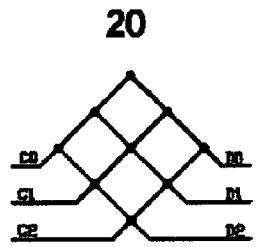 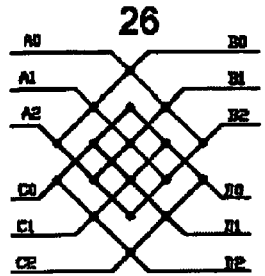
Fig. 10A    Fig. 10B    Fig. 10C
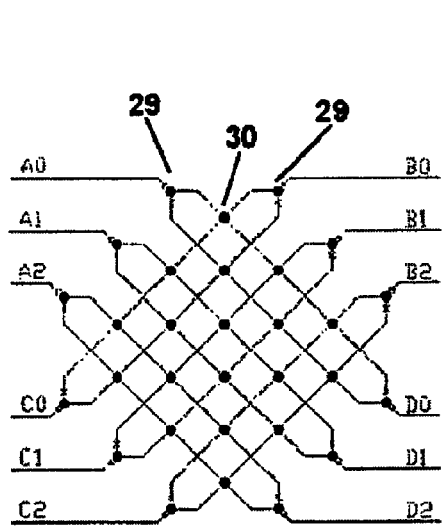 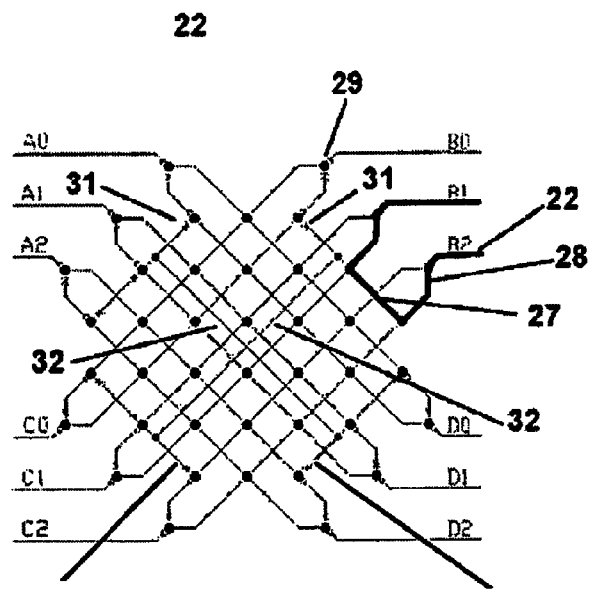
Fig. 11A    Fig. 11B

PATH REDUNDANT HARDWARE EFFICIENT COMMUNICATIONS INTERCONNECT SYSTEM

This application is the U.S. National Stage of International Application No. PCT/US2008/072618, filed 08 Aug. 2008, which claims priority to and the benefit of U.S. Provisional Patent Application No. 60/955,292, filed 10 Aug. 2007, each said patent application and any priority case hereby incorporated herein by reference.

I. TECHNICAL FIELD

The present invention relates methods and devices in the area of Telephony and Communication equipment and, more particularly to the "switching fabric" that may comprise the connection and servicing of copper pair and fiber optical crossconnects among other aspects such as are found in voice and data phone systems. Certain features of the invention may also be applicable to computer systems architectures, routers, and other data collection or transmission systems and where larger matrixes of signals or lines may be interconnected.

II. BACKGROUND

Since its inception, telephony has depended upon the use of pairs of copper wire, also referred to as "copper loop" or just "loop", as the main local area data transmission medium. Although cable, fiber optics, and wireless links like microwave, satellite, and cellular telephones have greatly enhanced communication access for the subscriber, they do not yet replace copper as the main transmission medium for hundreds of millions of individual applications. The existing "copper loop" infrastructure in place today represents an enormous investment in resource and time.

Modern telephony requires connect, disconnect or modification of hundreds of thousands of services daily. Examples of such service changes are, connecting a new phone line for a subscriber's home, providing additional phone lines for a business, adding DSL or other high speed data link to an existing subscriber service, re-routing a phone line to bypass a faulty line, or disconnecting a phone service. Historically, when a subscriber requested a change in service, a repair or change order was generated to instruct a technician to make the required changes. Other applications can have similar needs.

In some regards, connections may involve physical interconnects required to transmit the intended data or information. Connections may also be abstract in that they are internal to a computer, software manifested, or the like. Such interconnects may be distinct from the switching process associated with making phone calls. Dialing services may be provided in a switching office by switching equipment perhaps even premises equipment which may perform the functions of establishing and releasing connections on a per call basis between two of more circuits, services or communications systems. Router services and connectivities such as may be found in internal computer architectures may be included as well. Dialing services may even rely on an infrastructure of existing transmission media and interconnects, including copper pairs and fiber optics, perhaps such as described in the preceding paragraphs to perform their function. Abstract signal pathways can rely on real or virtual switching (which may not be manifestly visualized) to direct the appropriate communication.

With technology advances demanding ever increasing flexibility and connection speeds, installation, maintenance and upgrades of "loop" service to residences and industry is becoming an increasing problem. Similarly the challenge of internal computer communication among a variety of signal sources needs to be addressed. Having a technician test and hand wire connects and disconnects is labor intensive, costly, error prone, and can result in poor documentation records, poor quality, and low customer satisfaction. Documentation and billing of such services and changes are resource and time demanding tasks with record accuracy nigh unto impossible. As a result, the telephone industry has considered automated loop management systems, LMS. In some regards it has been desired that these systems be able to handle "loop" service for up to 40,000+ subscribers. These systems may be desired to automate "copper loop" related tasks that would otherwise be performed by the technician with the goal of reducing cost and overhead and increased documentation accuracy of loop management. An LMS may consist of a hardware component, perhaps a "switching fabric", and a software or other automated component to control the fabric and interface with a system administrator. Together they may be desired to provide complete automatic connect function under administrator/operator direction.

While a detailed description of the construction and operation of an LMS is unnecessary for this disclosure, some key characteristics and elements desired in a "switching fabric" may be helpful to understand the nature of the herein described invention. True arbitrary, any-to-any, non-blocking, fault tolerant, automated loop management systems that can support 100% fill in loop service for as many as forty thousand plus subscribers, as desired by the telephone industry, are either unavailable or largely prohibitively costly and unmanageable. Matrix switches, such as devices that include an array of switches or cross-points arranged and interconnected where a node, a signal or pair of lines, of an input set of nodes can be connected to a chosen node of an output set of output nodes such that a unique signal path is created through the array can be difficult to work with. For example a "simple" array, such as a simple one stage classic array, is shown in FIG. 2. This is inherently non-redundant because there is only one unique path for each selected connection. Redundancy, such as having one or more 'backup' systems or pathway available in case of the failure of the chosen system or pathway, is desired. In a matrix switch this can involve having multiple equally valid paths between the input and output nodes to provide the desired connections regardless of individual faults or blocked paths. Providing redundancy could require many additional parallel paths. Furthermore, composition of a large one stage, any-to-any matrix switch (one of the most traditional designs) is often impractical because, as the number of input (perhaps considered feeder pairs in some applications) and output (perhaps considered distribution pairs in some applications) increases, the number of array elements grows exponentially. For example, a 4,000 port array allowing 2,000 feeder pairs to be connected arbitrarily to 2,000 distribution pairs may require 4,000,000 cross-points, or 2,000 cross-points per connection. Even at $0.50 per cross-point this is $1000 per connected loop. A 20,000 by 20,000 array may require four hundred million cross-points.

A dominant cost factor in the construction of such fabrics may even be the number of cross-points in the fabric. All other costs may scale with the number of cross-points required for the final solution. There exist many schemes with various different topologies that provide array element count reduction. Banyan, Omega, n-Cube, Benes and Clos structures exist, for example. These have strengths and weaknesses but most are, to varying degrees, useful devices. One topology of interest may be the Clos Network.

In 1952 Charles Clos published a paper at Bell Labs titled "A Study of Non-Blocking Switching Networks" [The Bell Systems Technical Journal 1953, vol. 32 no. 2 pp. 406-424.] Clos's work provided a tops-down approach to reduced cross-point switching network design (e.g., given a desired array size, applying the Clos method may enhance the underlying array structure.) From some perspectives, his work has formed a basis for reduced cross-point switching systems ever since, however; the present invention shows considerable improvement was not understood or appreciated from this type of understanding. Similarly, there are specific variations of the Clos Network that have acquired identifiable and unique names. For example the Benes Networks can be viewed as a Clos Network that uses successive levels of recursion with a binary (2) radix sub-array size for all arrays. The present invention shows that this, too, failed to appreciate the types of advances that could yet be achieved.

To some degree, Clos may be interpreted as showing how a 'Simple' N by N array can be decomposed and reassembled as a three stage set of smaller sub-arrays such that the total number of cross-points can be significantly reduced. Further this rearrangement may also provide multiple possible paths for each connection and also redundancy and fault tolerance as desired by the telephone industry among others. Clos's theory may apply to symmetrical, X by X, and non symmetrical, or asymmetric, X by Y, arrays. As an example, see FIG. 3, depicting a general form of the classic Clos three stage network in a symmetrical or square array. This array can be understood as demonstrating how a 'simple' N by N array can be decomposed and reassembled as a three stage set of smaller sub-arrays such that the total number of cross-points can be significantly reduced. Further this rearrangement provides multiple possible paths for each connection and therefore provides redundancy and fault tolerance as desired by the telephone industry. For an array with N by N inputs, the sub arrays are specified to be of size n where $N \approx n^2$. The parameters of interest are n, m, and r, with $N=n*r$ inputs and $N=n*r$ outputs, where n is the number of inputs to each outer, left and right, sub array, r is the number of outside or exterior sub arrays required to provide N inputs and m is the number of center arrays required to accept all the inputs from the side arrays. It can be shown that m must be equal to or greater than n to provide a non-blocking array capable of 100% fill.

To illustrate the concept, we have chosen the case where m=n. Using our example of the 4,000 port array and applying Clos's technique for a three stage array to decompose the matrix into sub-arrays with $2000=n*r$, and n=m=40 and r=50 and then recombining them results in a complete solution requiring only 260,000 cross-points, or 130 cross-connects per connection. This is a savings of 93.5% or 3,740,000 cross-points.

In spite of this impact, it remains a fact that this technique alone still does not provide enough reduction in array cross-point count to make the very large arrays desired by the telephone industry practical. However, by applying recursion to the Clos Network, further decomposition and recombination is possible. FIG. 4 depicts a level one recursive Clos network. It can be shown that such techniques may provide significant additional cross connect savings and that the application of recursion may even be more effective on very large arrays.

Again using our exemplary 4,000 port array, and setting n=8 and r=250 for the first decomposition and then using recursion on r such that $r=n'*r'$ to obtain n'=10 and r'=25 our example yields 122,000 cross-points. This is an additional savings of about 3.5% or another 138,000 cross-points for a total savings of almost 97%. Using n=5 and r=400 for the first recombination and then using recursion to obtain n'=5 and r'=80 and then using recursion again to obtain n"=8 and r"=10 our example yields 92,000 cross-points. This saves another 0.75%, and an additional 30,000 cross-points for a total savings of 97.7%.

Following the recursive examples, however, it is a fact that application of successive levels of recursion provides rapidly diminishing additional returns. For very large arrays, using multiple levels of recursion could still provide enough reduction in overall system size and cost to make the switching fabrics required by the telephone industry more feasible. There is, however, one more obstacle to overcome. The cross-point array configuration in which we chose m=n, to provide the minimum number of cross-points as used in our example is not strictly non-blocking Although there are multiple paths for each connection and all connections can theoretically be made allowing 100% fill, choosing the wrong path for any given connection may block all paths for a future connection. Such a network may be called conditionally or perhaps rearrangeable "non-blocking". Rearrangeable "non-blocking" infers that by rearranging the chosen paths, all paths can be completed (with varying degrees of and attempts at rearrangement) and this can be shown to be true for the network of FIG. 3 or FIG. 4. Unfortunately, because of the unanticipatable nature of the connections, there has been no known way to predict in advance which connection paths will not block the paths of future connections. Breaking a connection to move it to another path to make room for a new connection also may be disruptive to subscriber services and therefore perhaps generally unacceptable.

As stated in the previous paragraph, the array of FIG. 3, in which we chose m=n, is only conditionally "non-blocking". To make it unconditionally or strictly "non-blocking" and overcome potential service disruptions, additional center sub arrays could be provided and additional cross-points added to both side arrays. While the math shows that a network of any size (e.g. N by N) as illustrated in FIG. 3 with the minimum paths required for a conditionally "non-blocking" array where n=N/r is n, that is m=n, as stated for our simplified form of the network, the unconditionally "non-blocking" array, as proposed by Clos, requires m=2n−1. Therefore, even for relatively small sub arrays as in our example where n=40, the unconditionally "non-blocking" cross-point count is nearly double that computed in our example, i.e. m=79. For large arrays this doubles the size, complexity and cost of the three stage system and the application of recursion compounds the problem. Thus, a switching fabric based on the Clos Network desired by the telephone industry becomes much less feasible.

Going back to our example of the 4,000 port array and applying Clos's technique to obtain an unconditionally "non-blocking" matrix with $2000=n*r$, and n=40, m=(2n−1)=79 and r=50 results in a solution requiring 513,500 cross-points for a savings of only about 87.2% or 3,486,500 cross-points. Applying one level of recursion, as in our example above, we get 380,625 cross-points, for an additional savings of only about 3.3% or 132,875 cross-points and a total savings of 90.48%. Applying additional levels of recursion are unproductive as the cross-point count increases. Thus a non-blocking array remains largely uneconomic.

As can be seen from the discussion so far, the problems of network switching fabric construction, its complexity and cost as faced by the telephone industry has been a significant impediment to "loop" automation. Some of the prior art is instructive in gaining an understanding of the nature of the problems and shortcomings of the solutions provided. Some prior inventions include: U.S. Pat. No. 3,993,871 to Hjortendal, et al. Nov. 23, 1976, U.S. Pat. No. 4,088,845 to Lalanne, et al. May 9, 1978, U.S. Pat. No. 4,231,017 to Kiriyama, et al. Oct. 28, 1980, and U.S. Pat. No. 6,914,902 to Ayandeh. Jul. 5, 2005. To some extent, these focused on how to construct matrices and the support structures required to implement them and how to control the cross-point switches. They had little impact on reducing cross connect element count. For example, U.S. Pat. No. 5,644,115 to Knauer describes a test instrument switching matrix that is a simple N by M matrix. It involves specific composition and construction of the arrays. For the most part these problems have been solved by advances in electronics like the fabrication of miniature latching relays, MEMS technology, optical switches and the use of large scale circuit integration. Additional recent inventions include: U.S. Pat. No. 4,394,541 to Seiden Jul. 19, 1983, U.S. Pat. No. 6,696,917 to Heitner, et al. Feb. 24, 2004, U.S. Pat. No. 6,914,902 to Lu, May 31, 2005, and even the current inventor's own US Patent Publication US20040017805, to Smith, Robert B., Jan. 29, 2004.

It is interesting to observe the mind set in these inventions. Most assumed that the wisdom of related prior art was to some extent infallible. For example, U.S. Pat. No. 6,696,917 to Heitner, et al state the objective of using binary, $2^n$, for array sizes states "it is more advantageous to employ square crossbar switches preferably sized in binary increments as such devices are readily available in the industry." Such notions are clearly the result of the computer age and the proliferation of computer technology which permeates the entire communications industry.

US Patent Publication 20040017805, to Smith, Robert B., Jan. 29, 2004 illustrates interesting characteristics. An understanding of the value of recursion is demonstrated. Note that the sub arrays for the smaller arrays are based on binary, $2^n$, size increments as demonstrated by prior art. Use of 5×5 arrays is introduced only to illustrate the possibility of providing an assembled array size of exactly 500 by 500 ports. As it turns out, using only 4 by 4 and 8 by 8 arrays for a final array size of 512 by 512 would have been more efficient in providing 500 by 500 ports and would have had more redundancy, however, even the present inventor did not appreciate this until perhaps almost serendipitously realizing the fundamental concepts that lead to the present invention.

A drawback to even the present inventor's US Patent Application 20040017805, to Smith, Robert B. disclosure, however, is that it does not overcome the conditionally non-blocking problem illustrated above. The cross-point array configuration illustrated in US Patent Publication 20040017805, to Smith, Robert B. et al chose m=n, to provide the minimum number of cross-points. As discussed above in our example, an array based on m=n is not strictly "non-blocking" and therefore cannot provide 100% fill without substantial service interruption during routing of new connections.

To some extent this group of disclosures focused on modifying the complexity and size of switching fabrics and/or control in novel, but not always in practical ways from the present perspective. U.S. Pat. No. 4,394,541 to Seiden recognized the added size and cost of implementing the strictly "non-blocking" Clos network and therefore partially overcame the conditionally or rearrangeable "non-blocking" problem by placing "mid stage links" or additional cross bar elements in the center sub-arrays of the three stage array to allow linking a blocked path to an adjacent mid stage array to complete the path. While this technique can reduce the number of blocked paths, it is not sufficient to provide a guarantee of 100% fill as would be required to utilize all input and outputs of the fabric, nor does it address the need for additional outer stage links around the inner stages for the recursive solution. The scheme as presented may not work for five and higher stage Clos networks. The addition of many mid stage links are required to prevent all potential blocking and therefore the method appears not very useful from the present perspective. It does not adequately address the problem of ongoing service changes. When a subscriber service is terminated, the associated feeder and distribution pairs become available for other, different, associations. The scheme of U.S. Pat. No. 4,394,541 does not allow reassignment without disruption of other services, especially as the fabric nears 100% fill.

U.S. Pat. No. 6,696,917 to Heitner, et al presented a "Folded Clos Architecture" that attempted to minimize what is perceived as wasted input and outputs in the left and right sub-arrays. Referring again to the sample of FIG. 3, it attempts to more efficiently use "standard" square arrays to implement a strictly "non-blocking" structure. This was accomplished by folding the rectangular, n by m, input and output arrays into a combined square array. Unfortunately this folding wasted many cross-points in the resulting square array. The wasted cross-points can be computed for the array illustrated in the disclosure. Two 8 by 15 arrays require 240 cross-points (2*8*15=240), while the combined 23 by 23 array requires 529 cross-points (1*23*23=529). In this case conserving unused inputs and outputs requires a considerable waste of cross-points. Also in the illustrations, the individual center arrays, whose size was chosen according to the Clos method, may even be too small to be as efficient as desired. In this manner the Clos method might appear not as useful as possible to reduce total cost or size. In fact, total cost may go up because of the dominant influence of cross-points on overall cost. It is significant to note that reduced cross-point count was not the goal of that invention.

Regardless of existing methods and related theory and emerging cross-point technology, what is really needed is a significant change in the structures and procedures for switching fabrics in order to further reduce array size and better utilize array element properties. The new structures may also take full advantage of existing technology. Both these new structures and these new methods may apply to methods and practices in the field of switching networks.

III. SUMMARY DISCLOSURE OF THE INVENTION

Accordingly, it is an objective of embodiments of the present invention to provide a means for optimizing the structure and composition of a switching network fabric to obtain optimum high hardware efficiency configuration for the synthesis of a specifiable switching network. An objective is also to provide a system which can accommodate any connection arrangements so that service technicians and the like are not required to be as accurate and precise in making various connections.

A further objective of embodiments of the present invention is to provide a means of dynamically rearranging and more easily initially arranging the number of input nodes and the number of output nodes in the array to provide a fabric that uniquely fits the desired specifiable switching network.

A further objective of embodiments of the present invention is to provide a means of array element, cross-point, count reduction greater than that utilized in the prior art.

A further objective of embodiments of the present invention is to provide better resource utilization of certain characteristics of switching elements not previously utilized for Matrix Switches. An object of it is also to utilize a new type of switch, such as double throw switches for more efficient, hardware arrangements.

A further objective of embodiments of the present invention is the control of signal bandwidth limitations via uniformity and repeatability of array structures.

A further objective of embodiments of the invention is to produce a carefully crafted set of building blocks which allow substantial improvements in performance and size of copper pair systems.

A further objective of embodiments of the invention is to produce a carefully crafted set of building blocks which provide assembly and deployment of arbitrarily large switching networks. Naturally, other objectives exist and the above list is not to be construed as limiting.

IV. BRIEF DESCRIPTION OF THE DRAWINGS

FIGS. 5A and 5B depict simple switching elements as might be used in a cross-point switch array with a schematic representation of a single throw (perhaps also single pole, e.g., SPST) switch as used in a classic arrays and a schematic representation of another Single Pole, Double Throw (SPDT) switch as popularly produced in the industry.

FIGS. 6A, 6B, and 6C depict a construction of a three by three array with three differing schematic representations, a symbolic representation, a SPST representation, and a SPDT representation.

FIG. 7 depicts symbols for a simple cross-point SPST switch and a symbolic representation.

FIG. 8A-8E depict the symbols for a double throw (perhaps also single pole, e.g., SPDT) switch as used in subsequent drawings.

FIGS. 9A and 9B depict the symbols for a SPDT switch with "wired-or" input on the common leg as used in subsequent drawings.

FIGS. 10A-10C depict the symbolic combining of two 3 by 3 arrays to form a four port array with mirroring and interleaving of two 3 by 3 arrays.

FIGS. 11A and 11B depict the symbolic connection and porting of the interleaved 3 by 3 arrays to complete the four port array by connecting and porting interleaved arrays.

Figure 12:
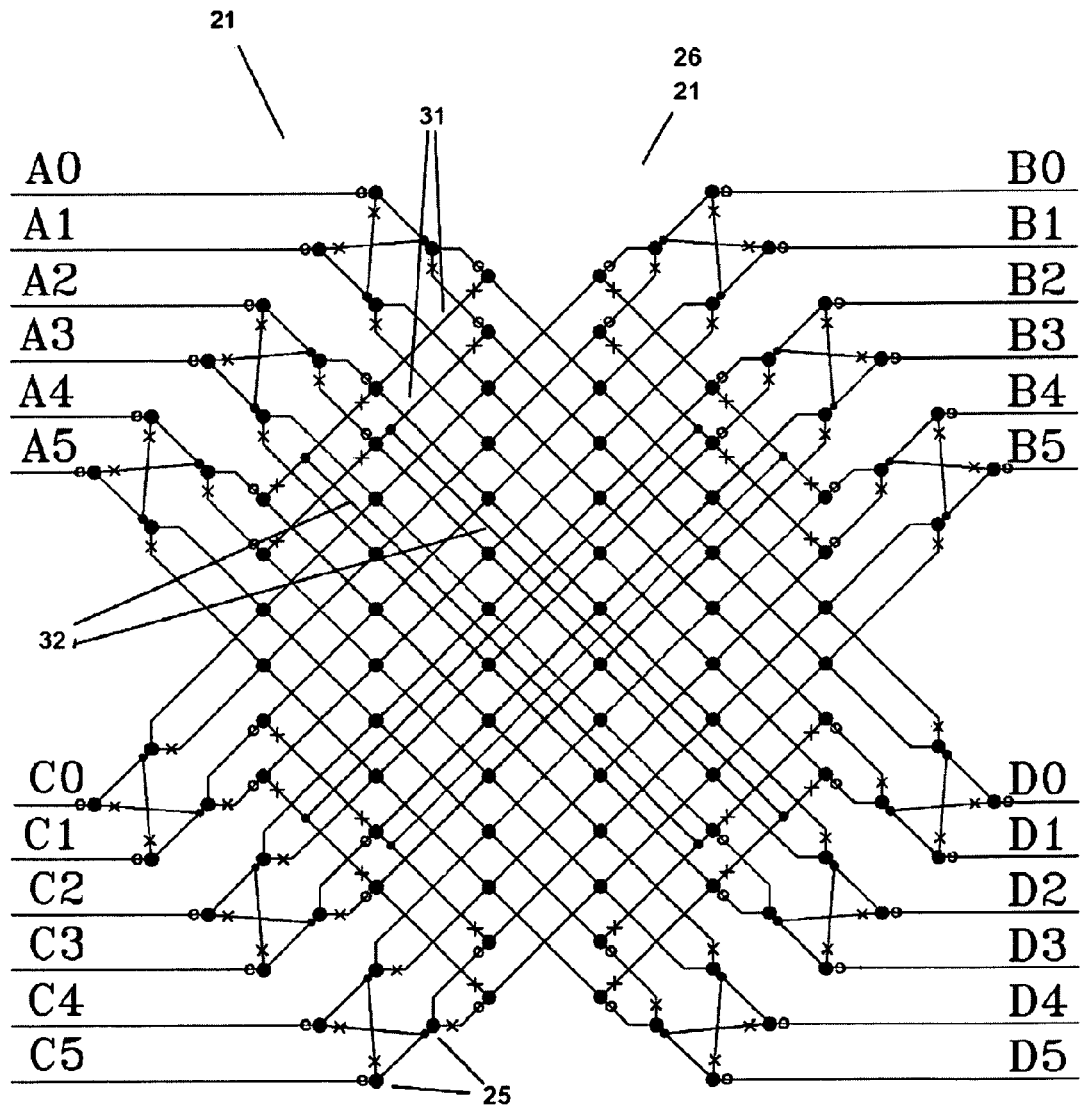

FIG. 12 depicts the symbolic representation of the one 12 by 12 four port array having 108 cross-points.

Figure 13:
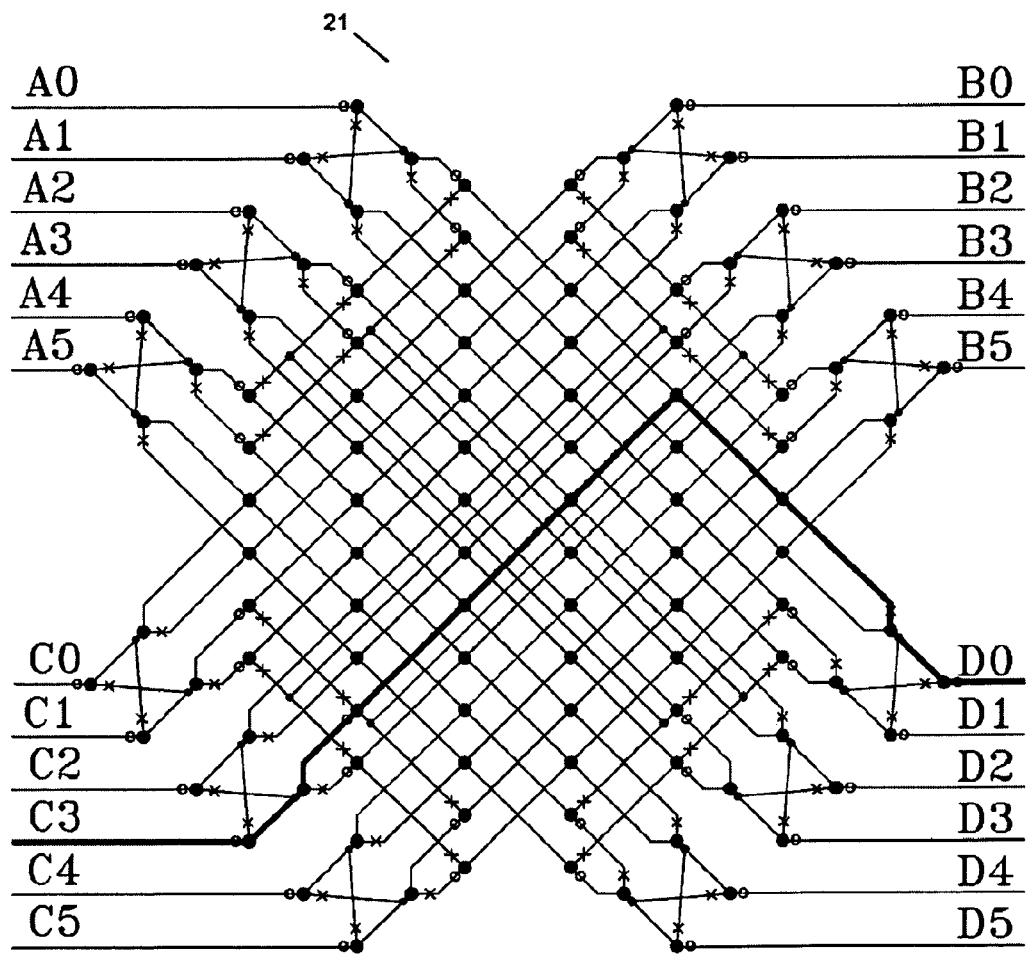

FIG. 13 depicts an example of a path through the 12 by 12 four port array.

Figure 14:
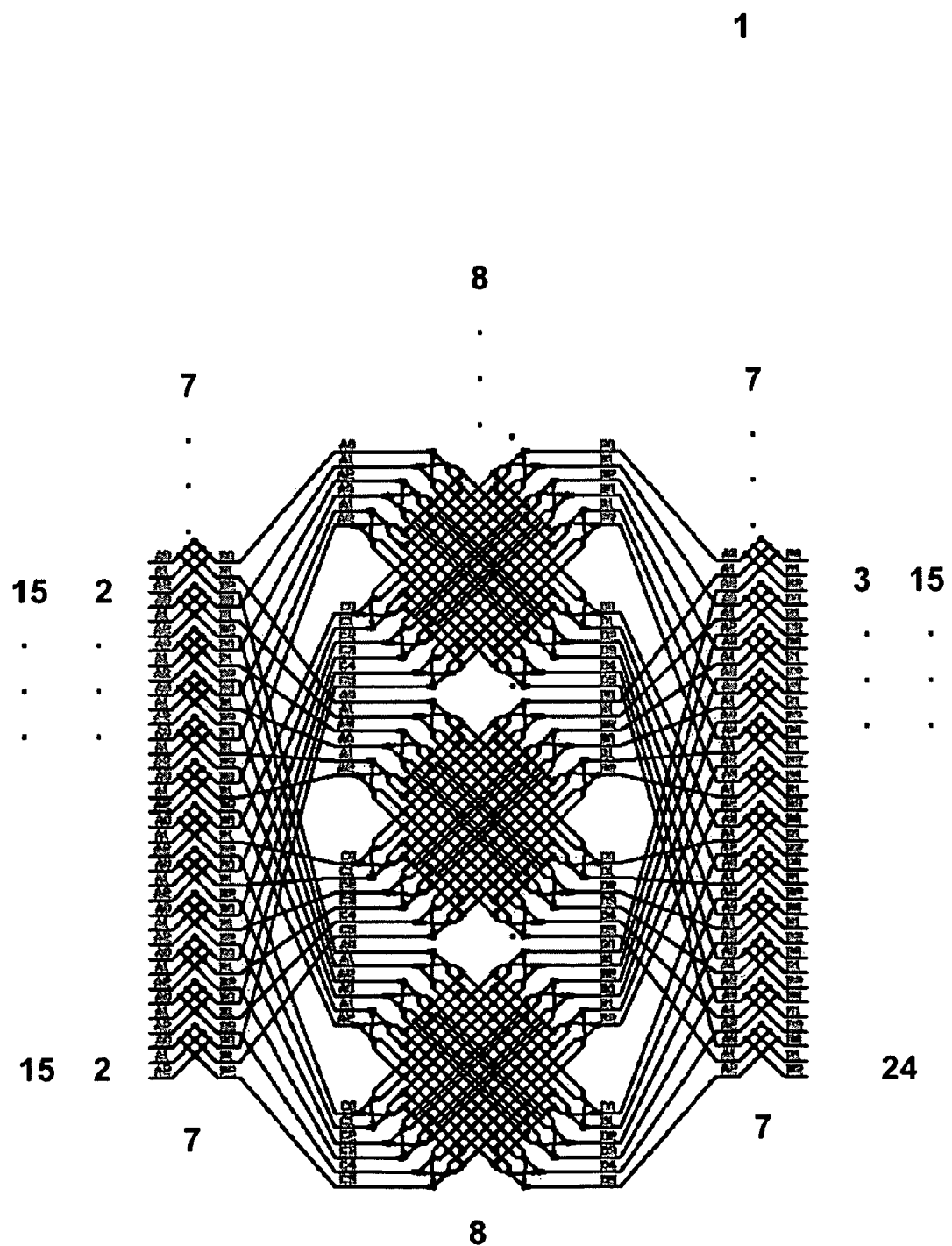

FIG. 14 depicts the symbolic representation of one 36 by 36 array using three 12 by 12 four port center arrays and two rows of twelve 3 by 3 side arrays, and having 540 cross-points.

Figure 15:
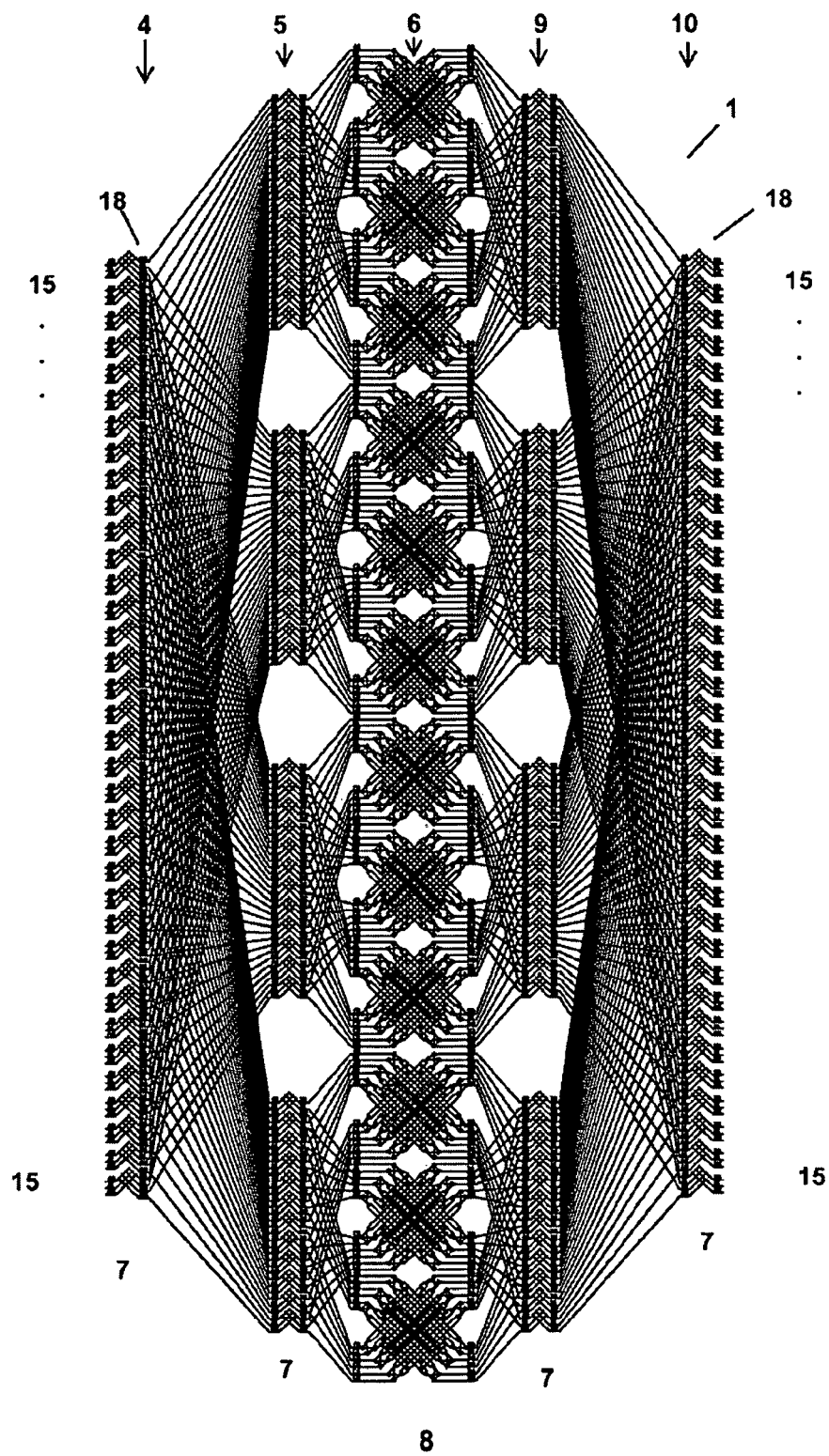

FIG. 15 depicts the symbolic representation of one 108 by 108 array using twelve 12 by 12 four port center arrays, four inner rows of twelve 3 by 3 side arrays, and two outer rows of thirty-six 3 by 4 side arrays, and having 3024 cross-points.

V. MODES FOR CARRYING OUT THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1A:
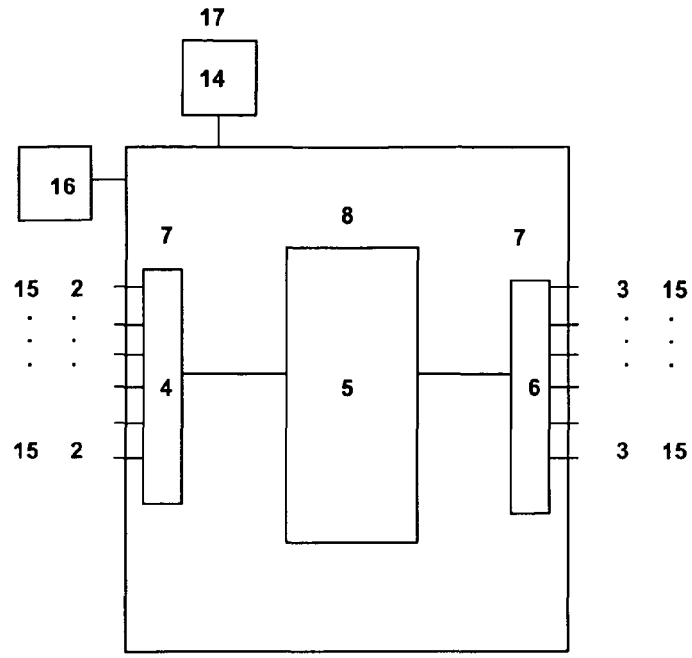
FIGS. 1A and 1B show schematic depictions of three and five stage interconnect designs.
Figure 1B:
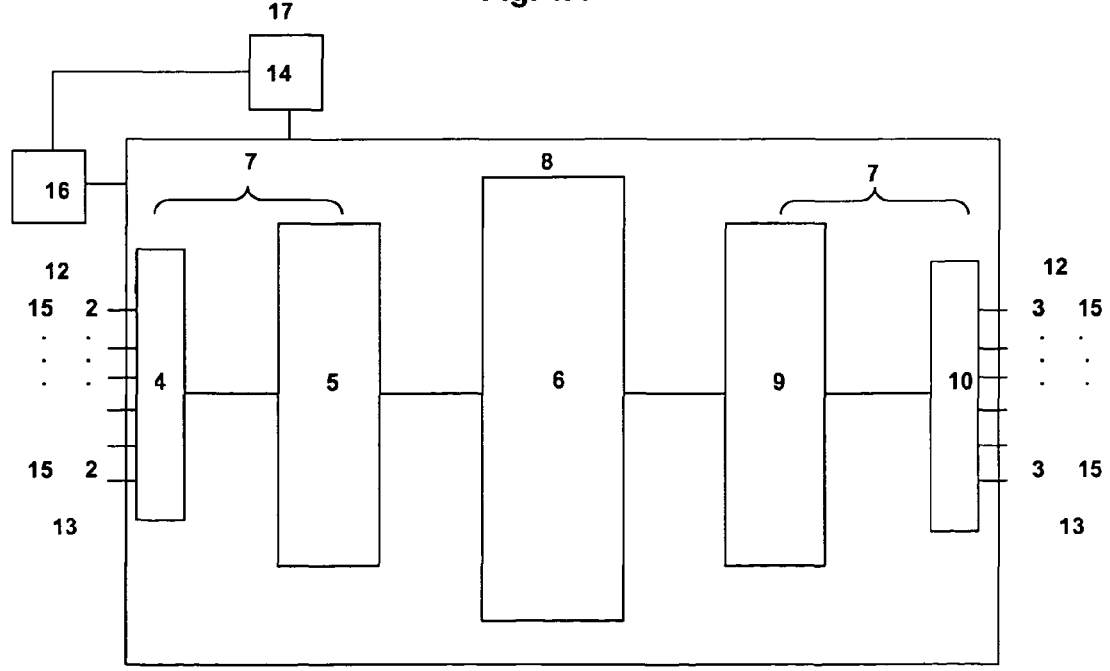

In order to understand it is helpful to understand a simplified array first. FIGS. 1A and 1B show schematic representations of two simplified communications interconnects (1). As shown in FIGS. 1A and 14, a communications interconnect (1), can involve a somewhat complex interconnection of wirings in three stages as numbered (4), (5), and (6). The communications interconnect (1) can be configured to accommodate a variety of communication pathways. These can include a collection of first pathways (2), as well as a collection of second pathways (3). As mentioned later, while these are often conceptually considered inputs and outputs, the present invention overcomes this preconception and both this and the realization of an entirely different switching modality for such interconnects are two important perhaps serendipitous realizations that lead to the advantageous designs developed. As also shown in FIG. 14, the communications interconnect (1) can be a staged sub array design; in FIGS. 1A and 14, a three stage design is shown. Each stage can actually been made of a collective of sub arrays. As shown in FIG. 14, the first stage collective (4) can be wired or otherwise communicate with a second stage collective (5), which can then be wired or otherwise communicate with a third stage collective (6). These stages can be designated side and center stages. As shown in these two figures, the first and third stage collectives (4) and (6) can be a collective of side stage sub arrays (7). Similarly, the second stage collective (5) can itself be a collective of center stage sub arrays (8). In this fashion, the communications interconnect (1), can be a staged cross-connect interconnect. Naturally, any number of stages can be included. However, in practical application, stages are typically done as odd numbers and so there is frequently (if not practically always) a center of array. Of course, the entire communications interconnect (1) can be controlled by a staged cross-connect interconnect controller perhaps such as a cross-connect switch controller (17). As shown in FIGS. 14 and 15, each stage can be a collective of sub arrays (7) and (8) (dotted numbers carry down the line but are skipped for visual simplicity). In FIG. 14, the collective of center stage sub arrays (8) depicts three such center sub arrays. Similarly, the collective of side stage sub arrays (7) depicts twelve side stage sub arrays (7). As can be seen, each sub array has a connectivity size. In FIG. 14, each of the side stage sub arrays (7) has a pair of three connections that may be considered (although not conceptually necessary) as three "inputs" and three "outputs". The center stage sub arrays (8) depicted in FIG. 14 are larger than the side stage sub arrays, and each of these depicts six connectivities. Thus the side stage sub arrays (7) may be considered 3×3 sub arrays and the center stage sub arrays (8) may be considered a 12×12 sub array. FIG. 15 shows a five stage communications interconnect (1). Thus, it includes a fourth stage collective (9) and a fifth stage collective (10). As seen in FIG. 15, more sub arrays are included within each stage. Again, however, the center stage is composed of 12×12 sub arrays and second and fourth stages are composed of 3×3 sub arrays. The first and fifth stage of the design shown in FIG. 15 is composed of 3×4 sub arrays, for loop-back advantages as will be discussed later. As shown this center stage also includes sub arrays that are larger than those of the side stages.

These sub arrays and the entire communications interconnect (1), can be configured for an appropriate connection arrangement. As depicted conceptually in FIGS. 1A and 1B, the configuration act can be accomplished by a configuration element (14). The step of configuring a staged cross-connect topology may be accomplished in order to establish one communication pathway responsive to another communication pathway. As mentioned earlier, these communication pathway capabilities can be considered as one of the first plurality of pathways (2) and one of the plurality of second pathways (3). Again, these can be real or virtual, perhaps abstract arrangements. In general for at least one pathway (2) to communicate with at least another communication pathway through the configuration process it may be necessary to configure the communication interconnect (1). Generally, in order to make the interconnect usable, the first pathways (2) and the second pathways (3) are accepted and perhaps physically connected to the communication interconnect (1). This can permit communication, namely, transfer all of information, power, or some other aspect, from a first communication pathway to a second communication pathway.

Figure 2:
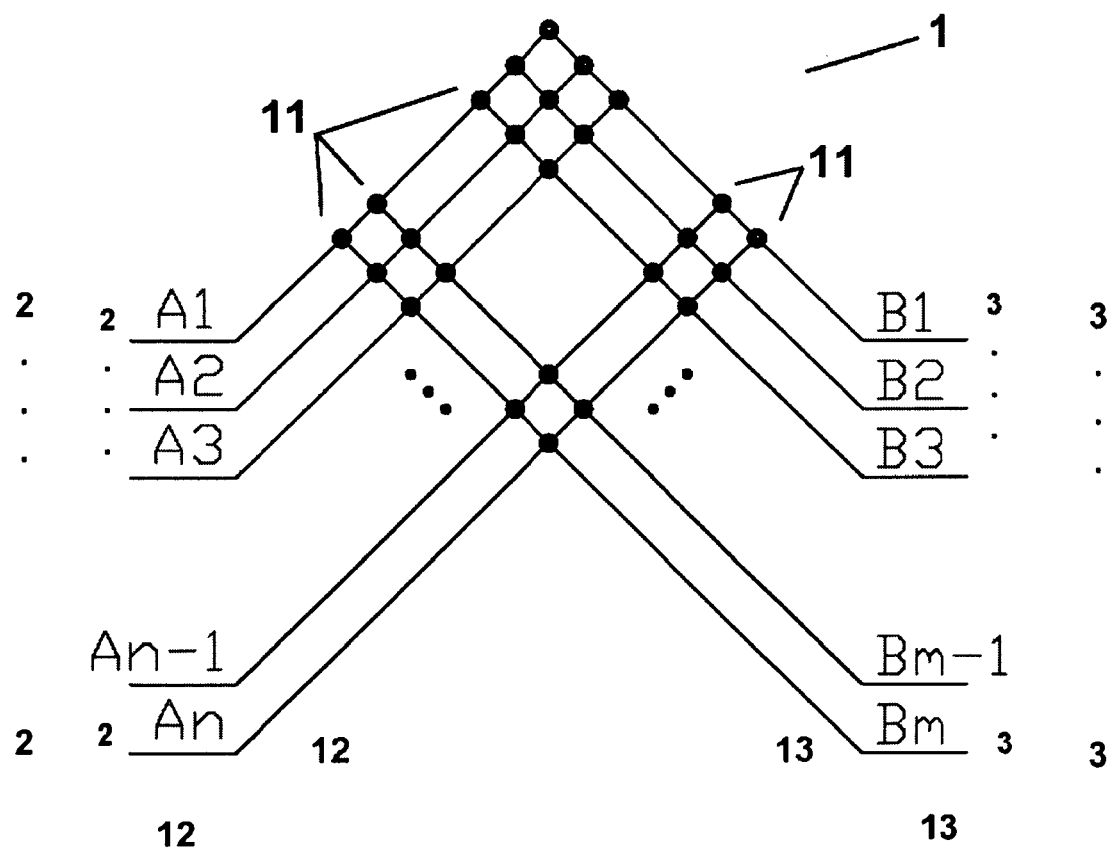
FIG. 2 shows a simple one stage classic array depicting the construction of a simple N by M matrix switch using symbolic representation of relays.

As can be understood from FIG. 2, each sub array can be considered as containing a number of commonality connectivity nodes (11). Each of these commonality connectivity nodes (11) can represent a junction of two different communication pathways. The junction can be indicative of an adjacent locality between pathways and may even achieve a connection to achieve communication from one pathway to another pathway. As mentioned above, one consideration is the number of commonality connectivity nodes (11). This can be important because at each of the commonality connectivity nodes (11), there may be of switch capability so that communication can be appropriately directed. As such, these nodes can represent cross-connect connectivity nodes, where pathway connections can be established. When the communication pathway passes from one pathway to another pathway, it can be considered a cross channel pathway connection, and it is the cross channel pathway connection that can be configured for an appropriate arrangement.

As stated earlier, the largest single contributor to fabric cost and size is often the cross-connect device count, or other switch capability count, and that all other costs usually scale with the number of cross-points required for the final solution. Size and cost are however not the only considerations for the practical success of the switching fabric. Several other important characteristics must be considered when determining the optimum configuration for the network. As shown in FIGS. 5 through 8, switch capabilities may be actual electrical switches. These switches may be configured to facilitate connection as desired. The configuration can in fact be switching of a cross-connect topology, which can utilize the arrangement and each or any stages of a communication interconnect (1).

As depicted in FIGS. 1A and 1B as well as FIGS. 14 and 15, the interconnect (1) can accept a plurality of first pathways (2) and a plurality of second pathways (3). These can be accepted at individual connection locales (15). One aspect, in which embodiments of the present invention depart from traditional designs is how the various pathways are considered. In most prior designs, generally the pathways were considered as inputs (12) and outputs (13). A significant (and perhaps serendipitous) realization of the present invention is that the mere designation as or conceptualization of pathways as being inputs and outputs can be constraining. While after implemented, the specified first pathway and specified second pathway may be acted upon as inputs and outputs, as feeders and distribution lines, or the like, in establishing the communication interconnect (1), embodiments of the present invention are not so limited. The input communication pathways (12) and the output communication pathways (13) can actually be at any location. Thus, while embodiments of the present invention can accommodate lines that are considered input (12) and outputs (13), connection to the communication interconnect (1) need not have a designated location for each. It is important to understand that while embodiments as depicted in FIGS. 14 and 15 show left and right configurations that might be considered as feeding from one side to another side, this arrangement is not necessary and it is only used for conceptual depiction. In fact, any first communication pathway can be communicationally responsive to, and can be capable of transmitting a communication or power or the like to, any other communication pathway. Thus embodiments can be true any-to-any communications interconnects (1).

Copper pair, coaxial cable, wave guides and fiber optics are all examples of transmission lines. It can be understood that the plurality of first pathways (2), and the plurality of second pathways (3) can be electrical wire pathways. Similarly, they may represent optical fiber pathways, or even just abstract signal pathways. Furthermore, it is possible that each pathway can accommodate multiple signals. One line can contain multiple signals such as through simultaneous amplitude modulation and frequency modulation or the like. The pathways can therefore be multiple signal accommodative signal pathways. These may accommodate digital and analog signal and so the pathways can be considered as multiple analog signal accommodative signal pathways or multiple digital signal accommodative signal pathways. Similarly, in an electrical wire arrangement, the configuration element (14) can be an electrical connection configuration element or electrical type of configuring element (14) which can accomplish electrically connecting any two (or more, such as for testing or the like) of the desired individual connection locales. Obviously, an optical fiber configuration element (14) can also be used to accomplish optically connecting any two (or more) of individual connection locales (15), etc.

In using copper pair, or coaxial cable, among others, one factor to be considered is signal deterioration. A transmission line has a characteristic impedance represented by a per unit length inductance, a per unit length capacitance and a per unit length resistance. The addition of a switching fabric to the lines can introduce line mismatch to a greater or lesser degree. The degree of the mismatch may determine the added signal distortion and attenuation caused by the switching fabric. The mismatch has several components. They include, but are not limited to, resistance, inductance, parasitic capacitance, phase shift and reflection. In addition, the switching fabric can also introduce noise, and crosstalk and interference from other signals in the fabric. It is highly desirable to keep all of these unwanted effects to a minimum in order to maximize system performance and bandwidth. Truncated pathways can also be one way of addressing this.

Redundancy of paths, whether for facilitating changes to service or for fault tolerance and self healing can also be important. Communication interconnects (1) of certain embodiments show path redundancy in that more than one path can link specified first communication pathway to a specified second communication pathway. This can be important when changes are necessary. By utilizing a redundant configuration cross-connect topology, embodiments can permit a seamless user change in the communication interconnect (1), while still maintaining a communication between the two specified pathways. To maintain redundancy two or more paths may be desired from any/all input to any/all outputs in the matrix. More than two paths may even be desirable. It would also be advantageous if faults could be self healing. While self healing is difficult to achieve, it is sufficient if a fault can be detected and routed around or bypassed via one of the alternative paths. If the number of alternate paths is large, the probability of reroute success is greatly improved and thus the time of interruption can be substantially reduced or perhaps even virtually eliminated. One aspect in which embodiments of the present invention differ from the prior art is that they can utilize a conditional blocking arrangement in a manner that remains hardware efficient and balances the amount of difficulty or rerouting that is necessary upon a change. Importantly, this can be maintained, with no limitations on the connections or the places at which the first pathways (2) or the second pathways (3) are connected such as at the individual connection locales (15). Thus, embodiments can accommodate a fully unconstrained connectivity. The communications interconnect (1) can be considered as an any-to-any interconnect collective of sub arrays in that literally any pathway can be connected to any other pathway, be it input or output. This can be true, regardless of where such a first or second pathway is connected to the communications interconnect (1). In this fashion the communications interconnect (1) can be configured for any-to-any connectivity, that is, any first pathway (2) can be connected to any other pathway—be it one of the plurality of first pathways (2) or one of plurality of second pathways (3) (perhaps other than itself, of course). This aspect provides a fully unconstrained interconnect collective for communication between any two (or more) individual connection locales (15). In like fashion, the communications interconnect (1) can be considered an any-to-any interconnect, and the step of configuring the device can be the step of configuring an any-to-any interconnect. In embodiments where a switch capability is employed, configuration can involve any-to-any interconnect switching as a way of connecting any input or any output to any other pathway be it one of pathways traditionally considered as an input or an output. By avoiding the constraint of having set input groupings and set output groupings, embodiments can accomplish undesignated locale connecting. This can facilitate the technician or maintenance person from having to connect certain wires or the like to certain particular locations. By permitting a person to have the ability of fully unconstrained selecting of a connection location, service errors can become irrelevant or at least can be significantly reduced.

The aspect of having unconstrained connection capability can be understood from the sequence of events that can occurs in one such embodiment. First, of course, the communications pathways can be accepted and arbitrarily connected to the communications interconnect (1). Importantly, this can be done in an arbitrary manner as to one or all of the pathways. After such connections are made, embodiments can accomplish determining an interconnect connection location or an individual connection locale (15) for one or more of pathways. As shown schematically in FIGS. 1A and 1B, this step of determining can be accomplished by an interconnect connection locator (16). This interconnect connection locator (16) can be responsive to any or all of the first or second communication pathways (2) and (3). The interconnect connection locator (16) can be a signal test element that can send or merely accept a signal through a specified communication pathway and detect the presence or absence of that signal at any specific place, remote or on site. Similarly, connection documentation data entry can be used after the fact. By signal testing a communication pathway or by utilizing connection documentation data, the appropriate configuration can then be accomplished. This configuration can be accomplished through a post-connection cross-connect topology configuration element which is configurationally responsive to a cross-connect switch controller (17). This cross-connect switch controller (17) can respond to the interconnect connection locator (16) separately or through the interconnect, and can provide input to the configuration element (14). Importantly, in some preferred embodiments, the cross-connect switch controller (17) can be an automated cross-connect switch controller in that it can accomplish its functions without substantial user or maintenance personnel input, such as through programming or the like. This type of functionality can even be achieved remotely so that maintenance technicians can simply connect wires at any location and then leave the entire configuration process to a computer perhaps based elsewhere. In this fashion the cross-connect switch controller (17) can serve as a remote cross-connect configuration controller. As mentioned above, in situations where there needs to be a reconfiguration of an existing established connection pathway, a cross-connect switch controller (17) can serve as a cross-connect reconfiguration controller to configure or even automatically reconfigure a cross-connect topology. Again, by remotely configuring the communications interconnect (1), maintenance technician errors and connection errors can be minimized or even irrelevant. Significant to this embodiment of the invention is the fact that the arbitrary connection capability can be accomplished before the location or determination steps.

As mentioned above, embodiments can involve conditional blocking communications interconnects (1). This may mean that after establishing a first connection when it comes time to establish a second connection, it can be discovered that the first connection pathway needs to be changed in order to facilitate the second connection. Embodiments of the present invention can accomplish this with a limited amount of rerouting required as compared to the number of cross-connects included. Connection success rate is also an important consideration. Feeder and distribution pairs are expensive to place and recovery of unused pairs can be an important concern. It is often most desirable to have a switching network that provides 100% fill. It is also important to be able to complete connections between any specified feeder and distribution pair 100% of the time. As mentioned above, service personnel no longer need to be concerned with which individual connection locale (15) is utilized for any wire. By permitting an arbitrarily connected communication pathway and the step of arbitrarily connecting pathways, embodiments of the invention can eliminate maintenance technician errors of this nature and the like.

When connecting all input nodes to all output nodes one at a time in an arbitrary fashion in an unconditionally non-blocking network like the full Clos Network where $m=2n-1$, the success rate is unity or 100%. That is, every connection can be made on the first try; this comes at the expense of the cross-connect count, however. In the conditionally non-blocking network where $m=n$, the first pass connect success rate may statistically be much less than 100%. When a path is blocked, usually one or more of the blocking paths must be moved to allow the new path to be completed. The problem is that ripping up these paths to place them elsewhere is disruptive to subscriber services and therefore generally unacceptable. This can apply even outside of a telephony context as rip up routers and shove routers can be altered to avoid these types of disruptions as well. As one alternative, embodiments show that it is not necessary to make a connection on the first pass if it is always possible to move the interfering connections without a significant rip-up. That is, it may be desirable for the moved connections to be displaced without disturbing the provided service.

The present invention offers a switching fabric, similar to the Clos Network, that has m=n+1 at the outermost level and m=n for all inner levels and so can allow all connections to be moved without interruption. When a signal path must be moved, the new path can even be established before the old path is interrupted. Embodiments of the invention achieve this hardware efficient design is illustrated in FIG. 15. As shown, the first and fifth stages (4) and (10) utilize 3×4 sub arrays (3=n and 4=n+1). From one perspective, this can be considered to present a superfluous capability. For example, it can be viewed as if although there are three inputs, there are four outputs. Since no more than three inputs could provide an output, the fourth output can be viewed as superfluous. In fact, this arrangement permits a hardware efficient design by reducing the number of cross-connects or switches without causing difficult rip-up needs. Thus, interconnects can be considered as presenting a superfluous capability side stage sub array. This can be combined with more traditional sub arrays. The superfluous capability sub arrays can be located at a side stage and can have an excess ability such as four "outputs" and three "inputs." By presenting one excess increment, that is four "outputs" as opposed the three "inputs", this collective of 3×4 sub arrays can be considered as presenting a collective of single excess increment sub arrays (18). While any number can be increased by a single excess increment, in fact, there are advantages to having one over the optimal 3×3 sub array. Thus, a particularly efficient communications interconnect (1) is one that utilizes a collective of three-by-four connectivity side stage sub arrays. In FIG. 15, the collective of superfluous capability side stage sub arrays is shown in stages one and five as compared to the 3×3 sub arrays shown in stages two and four (5) and (9). Just as the superfluous capability outer side stage sub arrays exist by having one excess increment increment connection, the inner side stage sub arrays in stages two and four (5) and (9) can be considered as presenting a balanced connectivity side stage sub array in that it has the same number of "outputs" to "inputs." Thus, the second and fourth stages (5) and (9) have a collective of balanced connectivity side stage sub arrays. Noteworthy is the fact that in this arrangement, the collective of superfluous capability sub arrays are present in the outer stages, namely, the first and fifth stages (4) and (10). As can be understood, superfluous capabilities can be presented at any location. It can be advantageous to locate the superfluous capability on the outer stages, so that the loop-back can avoid consuming any of the inner stage resources. Furthermore since it may be desirable to achieve a loop-back on either edge of the communication interconnect (1), the superfluous capabilities can be located in two stages and so there can be a first collective of superfluous capability side stage sub arrays and a second collective of superfluous capability side stage sub arrays. Naturally, not all of the collective needs to have the superfluous capability, however, for full functionality this can be desirable. With respect to the balanced connectivity side stage sub arrays, it can be unnecessary to make these superfluous and so resources can be saved by presenting other stages that do not include the superfluous capabilities. From a similar viewpoint, the collective of 3×3 sub arrays can be understood as presenting a collective of symmetric side stage sub arrays in that there are an equal number of inputs to outputs. Symmetry exists for both the 3×3 side sub arrays and the 12×12 center sub arrays, thus, there can be a collective of symmetric quadrilateral center stage sub arrays and a collective of symmetric side stage sub arrays, and a collective of symmetric inner side stage sub arrays, and a collective of symmetric bilateral inner side stage sub arrays. The three by four sub arrays can, by contrast be considered asymmetric and so there can be a corresponding collective of asymmetric bilateral side stage sub arrays, asymmetric bilateral side stage sub arrays, and/or asymmetric bilateral outer side stage sub arrays, or the like.

The modularity of the fabric structure can also be important. As may be appreciated from the figures, sub arrays can be repeated and designs can be arranged in a modular fashion. As illustrated in FIGS. 14 and 15, it can be visually understood how sub arrays can be reused repetitively and thus designs can present a collective of modular sub arrays. Clos used a tops down approach to switch matrix composition for a very good reason. There was no preferred size for a switching fabric. Each application was unique in that the number of feeder and distribution pairs were location and application specific. Smaller installations may require 800 feeder pairs to be routed to a subset of 1600 distribution pairs as in a local "cross box". Another application may require tens of thousands of pairs to be routed from a central office. In addition, existing installations are always being changed and upgraded as described by U.S. Pat. No. 6,901,071 to Lu. There would be great advantage in having a modular or building block design, such as one in which the blocks could be assembled to provide an arbitrarily large fabric as needed. As shown especially by FIGS. 14 and 15, the present invention fulfills this desire.

FIGS. 14 and 15, illustrate another aspect of embodiments of the invention. As shown, it can be appreciated that the center sub arrays (8) have connections on four sides, whereas the side sub arrays (7) have connections on two sides. From this perspective, the side stage sub arrays can be considered as presenting a collective of bilateral sub arrays (20) in that they have input and output on two sides. By comparison, center stage sub arrays can be considered as presenting a collective of quadrilateral center stage sub arrays (21) in that they may have connections on all four sides. As will be appreciated from the aspects of interleaving, it can be shown that a significant advantage can exist, when a quadrilateral design is utilized. Such can exist at any stage, of course.

Removing the constraints of input and output designations and offering a universal building block are also desires. As mentioned, a drawback of the prior art is the convention of designation of input (feeder pairs) and output (distribution pairs). This is a natural convention. In all cases the task is to connect certain inputs to desired outputs. This function defines the fabric as a two ported system with one set of lines as an input port and one set of lines as an output port. While this makes (or made) logical sense, it has become clear to this inventor that this convention is arbitrary and applies to the application of the fabric and not to the nature of the devices used in the fabric. It would be of great advantage if any node (copper pair for example) of a port of the fabric could be designated as an input or output and redefined whenever desired to make the modules or building blocks more universal building blocks.

Figure 3:
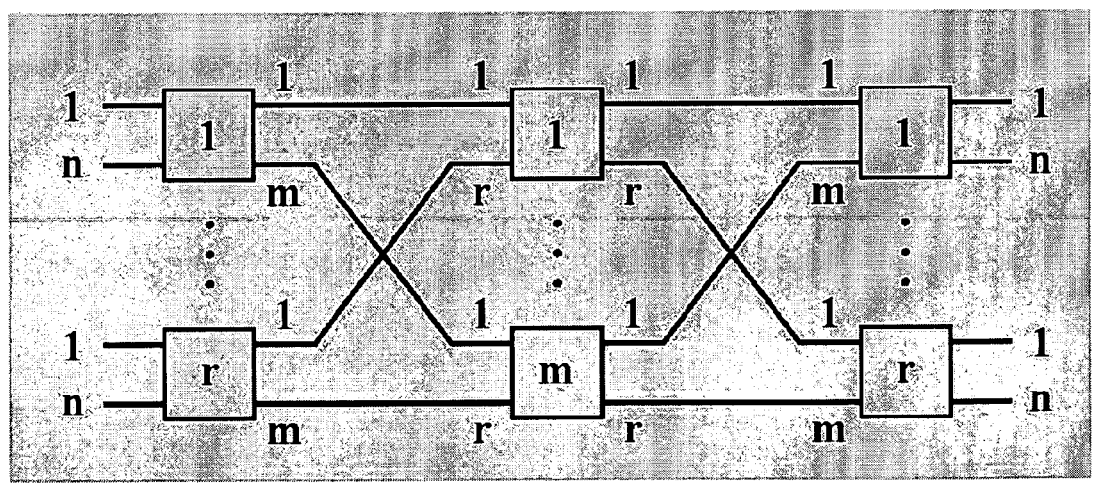
FIG. 3 depicts a block diagram representation of a general form of a Clos three stage network.

With these understandings and given these characteristics, the present invention can offer a new way to look at configuring an optimum array. As one example, there may be an optimum ratio of size of a center group of sub-arrays to outer sub-arrays. For a multi stage network as shown in FIG. 3, it can be shown that it may be beneficial to have the center arrays larger than the left and right arrays. This may not be intuitively obvious and is not disclosed in the prior art cited. A simple example can be used to illustrate this aspect. Assume an N by N array of size 15 by 15. Decomposition and recombination with r=5 (center array) and m=n=3 (side array) can require 165 cross-points (2*(n*m)*r+(r*r)*m=2*(3*3) *5+(5*5)*3=165), while decomposition and recombination with r=3 and m=n=5 can require 195 cross-points (2*(5*5) *3+(3*3)*5=195).

Applying the teachings of the present invention, it can be seen that an optimum ratio for the size of each of the center arrays compared to the size of the side arrays in a Clos Network with m=n as depicted in FIG. 3 is 2:1. Any deviation from 2:1 results in a less efficient cross-point configuration. Small deviations in this ratio are, however, not prohibitively costly. This optimum ratio may be viewed as a function of the specific topology or configuration of the sub arrays. In this case, the 2:1 ratio results from the fact that construction of all arrays, being simple two ported arrays, are the same and for the m=n configuration there are two (2) rows of side arrays and only one (1) row of center arrays. For small three or five stage Clos networks where m=2n−1, the optimum ratio may be larger than 3:1, but for all very large Clos networks, the ratio approaches 2:1 regardless of the relation of m to n.

Figure 4:
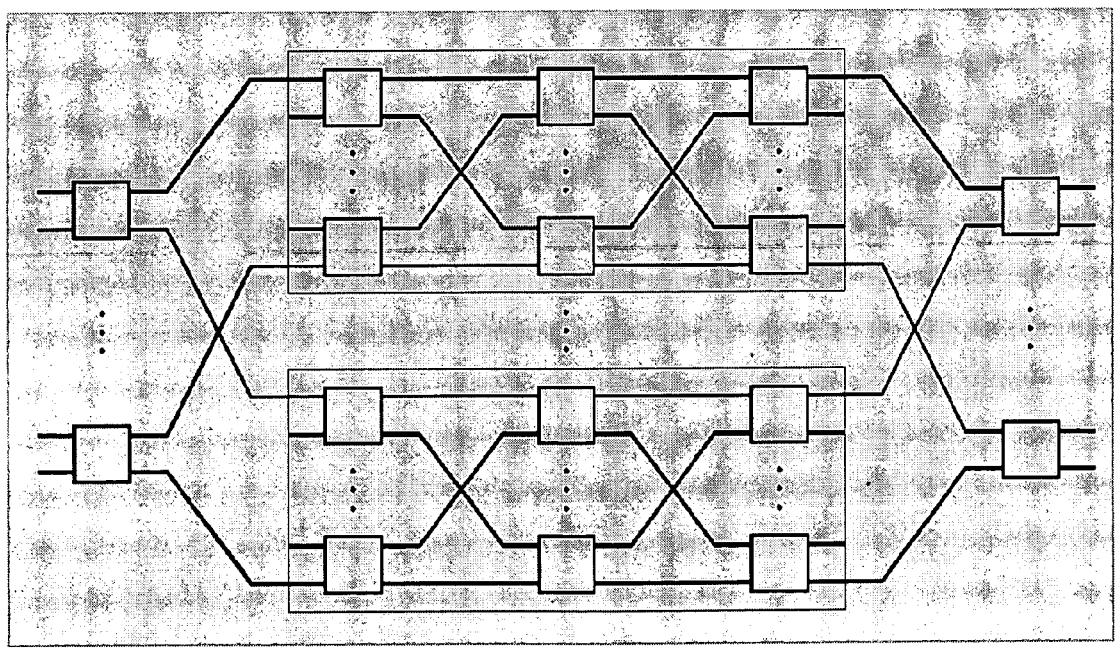
FIG. 4 depicts a block diagram a level one recursive network such as a Clos Network with one level of recursion.

The present invention also departs from existing understandings in providing an optimum size for a sub array radix. Earlier it was stated that recursion in a Clos Network as illustrated in FIG. 4 reduces the total number of cross-points required for a given size array, more generally N by M, or, for our example, N by N (N inputs by N outputs). Observation of the process reveals that the individual sub arrays became smaller with each recursion. It seems therefore advantageous to determine if there is an optimum size for a sub array to maximize cross-point usage efficiency.

The present invention can show that for any given size array fabric that uses recombination of sub arrays in the form of that depicted in FIG. 3 or FIG. 4 where m=n, the minimum number of cross-points will be required when the number of combinations for a set of cross-points C is maximized. Mathematically, we can express this as the point where the derivative with respect to n of $n^{(C/n)}$=0, where n is the radix, n by n, of the sub arrays. Evaluation of this equation yields the number e (~2.718). As e is not an integer and real world switches come in units of one, the closest number to the ideal value is three (3). Therefore the size of the most efficient sub array is 3 by 3. 3 is a prime number and therefore not related to binary numbers. Therefore the assertion made in U.S. Pat. No. 6,696, 917 to Heitner, et al that "it is more advantageous to employ square crossbar switches preferably sized in binary increments . . . " teaches away from the present invention. In fact, as the mathematical analysis illustrates, it is desirable to have a collective of integer averaged natural logarithm based connectivity side stage sub arrays. At the base level, this can be rounded to a 3×3 sub array.

The teachings of the present invention can also be applied to optimization of a Clos network configuration. Further, combining the optimum sub-array size with the optimum ratio of size of center matrix to outer matrix can result in an optimum multi-stage network where the center arrays are 6 by 6 and the side arrays are all 3 by 3 or more precisely a collective of three-by-three side stage sub arrays, and recursion is used as required to construct an arbitrarily large matrix. It is interesting to note that this rather small sub-array size can greatly facilitate the minimization of stub lengths, parasitic capacitance and reflections and therefore crosstalk and noise. It also can increase the number of redundant paths and can enhance modularity of the building blocks.

In spite of these advances, there can still be optimization problems in the center array. As such, from some perspectives, even the network described above can have two problems. Both of them may even have to do with the center sub-arrays. Mathematically, an optimum sub-array size may be viewed as a 3 by 3. Therefore although a 6 by 6 center array size presents a collective of six-by-six connectivity center stage sub arrays that makes an optimum configuration for a Clos Network, in and of itself a 6 by 6 array is not of optimum size. Attempting decomposition and recombination of the 6 by 6 into 2 by 2 and 3 by 3 using the Clos method does not provide any improvement. For example, 6*6=36 while 2*(2*2)*3+(3*3)*2=42.

A second problem may be the use of resources in the center array. Providing the capability of connecting from a left port to a left port (loop-back) or from a right port to a right port (also loop-back) of the array as may be desired for a universal building block uses up center array resources too fast. Embodiments that present a loop-back communication pathway switch capability or a loop-back communication interconnect (22) can address this aspect. By loop-back, it should be understood that one pathway can turn around and come right back through a similar grouping. While at first glance, this might be considered unnecessary, in fact, when any-to-any connectivity or undesignated connections are provided for, this can be highly desirable. Further, it should be understood that this loop-back capability can be provided at a noncenter stage loop-back communication interconnect to avoid using inner resources when not required. Considering all options, there can be one or a collective of side stage loop-back communication interconnects, outer side stage loop-back communication interconnects, and even center stage loop-back communication interconnect loop-back switching. Of course, the loop-back event can occur through the configuration process. By proper configuration, embodiments can achieve configuring a loop-back communication pathway, configuring only side stage cross-connect topology, configuring a center stage loop-back interconnect communication pathway, configuring a loop-back communication pathway, configuring only side stage cross-connect topology, configuring an outer side stage loop-back interconnect communication pathway, and even configuring a center stage loop-back interconnect communication pathway.

In the prior art, there had been a teaching away from loop-back configurations. This may have been due to the fact that in traditional designs, completing a loop-back would often consume the resources of two entire pathways. To the extent this was true, loop-back capability was considered as not providing the desired universal building block. Providing loop-back capability may require considerable additional center sub array cross-points. In fact, a 6 by 6 array with full loop-back capability would likely require 48 cross-points. To avoid this inefficiency, it may be noted that providing loop-back when the center array is not used to complete the connection (such as might be the case when creating a path between two left ports when both are connected to the same left sub-array, or two right ports are both connected to the same right sub-array, see FIG. 3) does not cause a resource shortage because other sub-array resources are freed when the connection is made. Thus, only modification of the center array may be required to provide sufficient resources to construct the universal building block from this perspective. The present invention discloses such a solution in a manner that is a departure from the classic Clos structure for the center array.

It should be recalled that the diagrams present a schematic representation of the array. For example, referring back to FIG. 2, each dot in the diagram should be understood as a symbolic representation of a more complex device, the crosspoint switch. (The dot may also represent a purely symbolic concept as in a flow chart or a computer program that performs matrix operations; in this case there may be no equivalent physical implementation.) The actual device may be composed of several elements and can take any one of several forms depending on the specific application. It may be an optical switch, a mechanical relay, a MEMs switch, an integrated circuit, etc. For example, with copper loops there may be actually two circuits, one for "tip" and one for "ring". Therefore two switches in tandem may be required to make the connection at each cross-point. Functionally all crosspoint switches may provide the ability of either closing or opening a connection or path between the 'A' and 'B' sides of the array. The exact construction of these switching elements is not controlling, rather, understanding the function provided is important for visualizing the construction of the classic switching array and the herein described improvements. We will merely use simple switching elements as shown schematically in FIG. 5 to illustrate the function.

FIGS. 5 through 9 illustrate embodiments that utilize different switching capabilities. A single throw switch (24) is one that has a connected or disconnected state. It may be configured with a single pole as an SPST (Single Pole Single Throw) switch having two stable states, open and closed. As used in an array, normally the open state will be the reset or rest state while the closed state will be the set or energized state. In contrast, a multi- or double throw switch (25) has two (or perhaps more) alternative states, that is, a connection to a first pathway or a connection second pathway. In a single pole arrangement (any number of poles can exist, of course), it may present an SPDT (Single Pole Double Throw) switch shown having two stable states. However in this switch the reset state connects the common leg to one contact and the set state connects the common leg to a second contact. These represent the simplest forms of such switches. There is also a three position switch that has closed-open-closed positions. This switch can be used in replace of the double throw switch or the SPDT switch discussed above with virtually identical results.

Working with a 3 by 3 matrix, FIG. 6 shows how an array can be connected using SPST switches and how it looks if the SPDT switch symbol is used. Note that for the SPDT switch the rest state connection may not be used. As such, it may present an unused switch output (23) and embodiments with this design can involve permitting an unused switch output (23) as shown. This may be significant because while the cost of the second connection is minor compared to the total cost of the device, it is an inherent attribute of the switch and a significant resource that could be used if the topology of the array were appropriately altered.

There is one other feature illustrated in the schematics as shown in FIG. 6 that is of interest. In examples, 6B and 6C, the SPST and SPDT examples, when two or more lines, perhaps electrical connections, meet and are joined, the connecting intersection is generally designated with a small dot. This dot indicates that there can be a junction instead of a crossing of the lines. The same notation can be used to indicate a "wiredor" connection. As a specific example of a double throw switch (25) illustrates, such a capability can be used to present interconnect configured multiple alternative output switch capabilities. Of course, there are other examples of a wired-or switch capability that can be used to present a wired- or alternative communication pathway. By the actions of multiple alternative output switching or by wired-or switching, the communications interconnect (1), according to some embodiments of the invention, can establish an alternative pathway between two individual connection locales as well. Double throw switches (25) can effectively exist by paired single throw switches. Further, from the perspective of hardware efficiency, it can be understood how the communication interconnect (1) can also include capabilities that involve both sub arrays with a plurality of single throw switches and a plurality of multiple throw switches. Using the example of double throw switches as but one type of multiple throw switch, it can be seen that with exterior sub array double throw switches (29) shown around the outer edge of the center arrays in FIGS. 14 and 15, and interior sub array single throw switches (30) hardware costs can theoretically be minimized. This may exist only in theory, because in fact a cost difference between fabricating single throw and double switches may be so minimal that it is better to utilize double throw switches throughout. Using the combination of single throw and double throw switches, embodiments of the invention can achieve configuring at least one double throw switch, configuring at least one pair of single throw switches, configuring a plurality of single throw switches, configuring at least one multiple throw switch, configuring a plurality of double throw switches, or even and configuring a plurality of single throw switches as well as any combination thereof. As may be appreciated, two or more wires may be electrically connected at a point. FIGS. 6B and 6C each have twelve such connections. In a printed circuit board, or IC, wire-or switching can even be considered as "free" and can take up virtually no space and so using double throw switches throughout or the like can be used to advantage in embodiments of the present invention.

To reduce the complexity of the next few drawings, symbolic representation for the Simple SPST Switch, the Simple SPDT Switch and for the wire-or'ed switch are here defined as indicated in FIGS. 7, 8, and 9. By developing cross-point symbols to represent these characteristics design understanding and enhancement can be achieved. FIG. 7 illustrates symbols for a normal cross-point intersection as described and used previously in this disclosure. For this symbol, orientation does not matter.

Similarly, FIG. 8 illustrates four symbols all used to represent the SPDT switch in different orientations as they can be used. In these symbols, the "c" may indicate the common leg of the switch and the "x" may indicate the normally open contact. The contact numbers will not be used in the drawings and do not tie to the main drawing numbering; they are given here to clarify contact designation. Orientation of these symbols does matter as shown in FIG. 11B and FIGS. 12, 13, 14, and 15. The symbol in FIG. 9 represents the SPDT switch with a wired-or input. The "dot" replaces the "c" to indicate the wired-or common leg of the switch and the "x" indicates the normally open contact. Again, orientation of this symbol does matter. It should be understood that the symbol for the wired-or function when used alone is just the small dot.

The simple 3 by 3 array depicted in, FIG. 6A is awkward, however, to integrate into a large array structure. Using a form of the array like that in FIG. 2 where the array structure has been rotated 45 degrees is much easier to use. Therefore the balance of the disclosure will use diagonally oriented arrays like FIG. 2 when complex arrays are depicted.

Returning to optimization of the center array, it can be understood that optimization of the center sub-array may require the application of all the switch attributes described above. The new array may be assembled from multiple 3 by 3 arrays. They may be combined using SPST switches for the cores and interleaving the cross-points in the matrix, for example see FIG. 10C. The aspect of interleaving arrays is also illustrated in FIGS. 10 through 13. An interleaved sub array (26) may be one that may involve multiple connections at least visually overlaid and connected between each other. Furthermore, the interleaved sub array can be arranged as a collective of interleaved center sub arrays as shown in FIGS. 14 and 15. By utilizing at least one interleaved sub array (26), communication interconnects (1) can more efficiently utilize resources. Furthermore, it can be helpful to utilize a collective of interleaved center sub arrays as shown in FIGS. 14 and 15. An embodiment may be constructed using SPDT switches to link the overlaid interleave arrays together, see FIG. 11, with wired-or capability to provide the additional resources required for loop-back. Again, traditionally, a loop-back capability would eliminate whole pathways. By utilizing interleaved designs, embodiments of the present invention can avoid this inefficient effect. Referring to FIG. 11B as one example, six additional resources can be included as shown by element numbers (31) and (32). As shown these can be considered truncated throughput interior sub array pathways. For example in FIG. 11B, it can be seen that there may be truncated edge sub array pathways (31) (four as shown in the embodiment in FIG. 11B) and truncated interior sub array pathways (32) (two as shown in the embodiment in FIG. 11B). When configured as a pathway the loop-back arrangement may use truncated cross sub array pathways (27) and truncated forward sub array pathways (28), such merely indicating different "directions" and thus they may be interchanged depending upon orientation of the array. Importantly, by the switching arrangements mentioned, in embodiments, these cross and forward pathways need not consume the entire path across the sub array or otherwise. In this fashion, embodiments may present a partial pathway consumptive loop-back communication interconnect and even a partial sub array pathway loop-back communication interconnect.

The SPDT switches may also be oriented such that when all switches are in the reset state no connected paths exist between ports. The resulting four port array may be viewed as the equivalent of a 6 by 6 two port array with full loop-back capability. In addition, the four ported array has redundant paths for every connection. Interestingly, such a four port array has only 42 cross-points. There can be 18 SPST switches and 24 SPDT switches. This is 6 cross-points less than, or 87.5% of, a traditional 6 by 6 array if it were to have full loop-back capability. Further, because such a matrix is inherently universal, any port can be used as an input or output. Thus it may provide the desired universal building block. As mentioned earlier, embodiments may have exterior sub array double throw switches (29) and interior sub array single throw switches (30) for efficiency. There may even be a collective of exterior sub array multiple alternative output switch capabilities.

With this understanding, the present invention permits re-evaluation of the optimum ratio of size of center sub-Arrays to outer sub-arrays. If the new four port or perhaps quadrilateral array is placed as the center arrays such as in FIG. 3, the optimum ratio for the size of center arrays compared to the size of side arrays for the new network configuration can be determined. With m=n at all levels, the new ratio is 4:1. The change in the optimum ratio is a direct result of the more efficient center array. Because the center arrays are only 6 by 6, the resulting network, although much more efficient than the original Clos configuration, may not even be of 'optimum size' to minimize cross-point count. An optimum ratio of 4:1 can even indicate that a center array size of 12 by 12 is closer to optimum provided that it retains the same characteristics as the four port array. Thus embodiments may have a collective of twelve-by-twelve connectivity center stage sub arrays.

Applying this understanding, the present invention can be further used to convert two of the four port 6 by 6 arrays into a 12 by 12 array. The mirroring and folding process used to create the four port 6 by 6 array can be employed to produce a four port 12 by 12 array from two four port 6 by 6 arrays or their equivalent four 3 by 3 arrays. The result can be such as shown in FIG. 12. Besides the internal wired-or of the original four port 6 by 6, additional wired-or may be employed at the input junctions of the four port 6 by 6 to facilitate interconnect. Such as design can have twelve additional resources to achieve its desired functions. The resulting array uses 108 cross-points, 36 SPST switches and 72 SPDT switches. In contrast, using a Clos Network to build a 12 by 12 array out of 3 by 3 and 4 by 4 sub-arrays requires 144 cross-point for a universal solution.

With this additional understanding, the present invention permits re-evaluation of the optimum ratio of size of center sub arrays to outer sub arrays. In fact, the optimum ratio of size of the four port 12 by 12 sub arrays can be determined. Evaluation of the resulting 12 by 12 array reveals that the optimum ratio is now 5:1, which indicates that a center array size of 15 by 15 would be optimum. The higher optimum ratio indicates that the 12 by 12 array is an even more efficient center array than the four port 6 by 6 array. This last ratio was computed for a nine stage array using m=n for all inner left and right sub-arrays and m=n+1 for the outer level of arrays as required to allow 100% fill without service interruption.

Using the folding and interleaving technique once more is also possible, however it would produce an array size of 24 by 24. A 24 by 24 array is above the optimum array size for a multi stage network because it is more practical to use recursion with more layers of left and right 3 by 3 sub-arrays to form large array. The drawing of FIG. 12 is fairly intricate, but because of the use of symmetry, a rather simple set of rules can be defined for navigating the array and considering the connection path through such a four port array. An algorithm that implements these rules is unnecessary to making or using this embodiment. Importantly, however, FIG. 13 is given as an example of how connections may be made. Two ports, C3 and D0, were chosen at random. Note that there are multiple possible paths between any two ports.

In providing the ability to reconfigure an interconnect, embodiments of the invention may include a cross channel reconfigurable interconnect, which can reconfigure a pathway such as from an input to an output. This reconfiguration can occur when there are service changes or maintenance needs. A cross channel reconfigurable interconnect can include a cross-connect switch controller (17) and that may be designed to serve as a redundant cross-connect reconfiguration controller. As mentioned above, an important aspect can be the ability to establish an alternative path for an existing linkage. It can be important to be able to achieve a reconfiguration, where the new path is established nearly simultaneously with breaking the old. This type of a design can be termed a make-before-break design. Such a design can include a make-before-break configured collective of sub arrays which can be controlled to first establish an initial interconnect topology. Upon receiving some sort of command, a cross-connect switch controller (17) can determine an alternative interconnect topology and then substantially simultaneously disconnect the old linkage and establish an alternative interconnect topology that may link the same two lines. Thus embodiments can accomplish reconfiguring a cross-connect topology or a system can accomplish establishing a cross channel reconfigurable interconnect.

Returning to the aspect of hardware efficiency in the context of larger arrays, by applying the teachings of the present invention it can be understood how such larger arrays or interconnects can be constructed. The advantages in such designs can even be greater for larger arrays or interconnects to some degree. For example, FIG. 14 depicts a 36 by 36 array. As can be seen, this array uses three 12 by 12 four port or perhaps quadrilateral center arrays and two rows of twelve 3 by 3 bilateral side arrays. Surprisingly, it has only 540 cross-points. Similarly, FIG. 15 depicts a 108 by 108 array. This uses twelve 12 by 12 four port center arrays, four inner rows of twelve 3 by 3 side arrays, and two outer rows of thirty-six 3 by 4 side arrays. It has only 3024 cross-points. Large arrays using the present teachings and invention can have significant cost advantages. Applying the teachings of the present invention, it can be shown to yield nearly eight fold advantages when choosing an array size of 26,244 by 26,244 which is the actual size for an array with seven sets of 3×3s and a center of 12×12. Although difficult to get an exact Clos match because of the fundamental differences in composition, comparisons can be made which show that there are significant advantages. For example as the following table indicates, a network according to the present invention would have about ⅛ the number of cross-points of an equivalent unconditionally non blocking Clos network.

a fully traditional redundant design, whereas the vastly improved Clos network would present only a 2.055% level. Obviously this can be seen as nearly an order of magnitude improvement. Efficiency can be measured and achieved in different ways, not just the multiples mentioned above, and so the resource-efficient interconnect can be less than 2%, less than 1%, less than ½%, or even less than ³⁄₁₀% of a traditional non-Clos design. It can also be far more than a matter of degree better than a Clos or a Benes network—some of the most efficient networks understood to date. These comparisons can include absolute values, comparisons with similarly sized input-output product values, a set size comparison (such as about twenty thousand as shown above), or even comparisons with numbers of stages of interconnects such as 3, 5, 7, 10, 15, or more staged interconnects with all permutations and combinations as set forth in the claims directed to this aspect (such being hereby incorporated by reference into this portion of the description). Similarly the ratio of an improved embodiment savings to Clos savings can be compared with like results such as yielding a ratio that is 2, 3, 5, 6, or even 7 or more times an improvement as gauged by this measure such as shown above as being 7.83.

| CLOS Network | | | | | | | |
|---|---|---|---|---|---|---|---|
| simple N × N | % | N × N N = | crosspoints | n | M | r | |
| 688695049 | 3.685% | 26243 | 25376655 | 161 | 321 | 163 | three stages |
| 702038016 | 2.055% | 26496 | 14429188 | 24 | 47 | 46 | five stages |
| 708624400 | 2.248% | 26620 | 15928920 | 11 | 21 | 20 | seven stages |

| Present Invention Network | | | | | | | |
|---|---|---|---|---|---|---|---|
| simple N × N | % | N × N N = | crosspoints | n | M | r | |
| 688747536 | 0.259% | 26244 | 1784592 | 3 | 4 | 12 | 15 stages |
| Ratio of solutions | 7.93 to 1 | CLOS/Present Invention Ratio | | | | | |

The bottom line is that, all other things being equal, a solution according to the present invention may provide a cost savings of nearly ⅞ths of the total cost of a Clos solution. This clearly shows that the advantages of the present invention are not just matters of degree but present a new realm of efficiency. In these fashions, embodiments can present a resource-efficient interconnect, that is an interconnect that achieves significantly higher than traditional resource efficiencies. Hardware savings can be tenths of a percent of a traditional interconnect and can even present multiples (such as eight fold) in savings over prior reduced hardware interconnects. These can have hardware usages that may be about 5, 6, 7, 8, or more times less than those "efficient" interconnects. As can be appreciated, the degree of efficiency can depend on the structure of the interconnect topology. Quantitative hardware efficiency (e.g., total number of cross-connects or perhaps switches) can also depend upon the total number of "inputs" or "outputs" or the total connections in embodiments where there is true any-to-any capability. Using the above example, it can be understood that this one 20 thousand or so connection embodiment according to the present invention can present a 0.259% level as compared to As can be easily understood from the foregoing, the basic concepts of the present invention may be embodied in a variety of ways. It involves both connection and switching techniques as well as devices to accomplish the appropriate connecting or switching. In this application, the connection and switching techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is also intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims are included for the device described, and method or process claims are included to address the functions the invention and each element performs. Neither the description nor the terminology is intended to limit the scope of either type of such claims.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any additional claims in this or any subsequent patent application. Language changes and broader or more detailed claiming may be accomplished at a later date. With this understanding, the reader should be aware that this disclosure is to be understood to support the existing as well as any subsequently filed claims as deemed within the applicant's right which may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures. These even may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "switch" should be understood to encompass disclosure of the act of "switching"—whether explicitly discussed or not— and, conversely, were there effectively disclosure of the act of "switching", such a disclosure should be understood to encompass disclosure of a "switch" and even a "means for switching." Such changes and alternative terms are to be understood to be explicitly included in the description.

Any patents, publications, or other references mentioned in this application for patent are hereby incorporated by reference. The priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition, are hereby incorporated by reference. Finally, all references listed in the following List of References or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

List of References

I. U.S. Patent Documents

| DOCUMENT NO. & KIND CODE (if known) | PUB'N DATE mm-dd-yyyy | PATENTEE OR APPLICANT NAME |
| --- | --- | --- |
| 20020146003 A1 | 10/10/2002 | Kam |
| 20030058848 A1 | 3/27/2003 | Dally |
| 20030193938 A1 | 10/16/2003 | Ayandeh |
| 20040017805 A1 | 1/29/2004 | Smith et al. |
| 20040019816 A1 | 1/29/2004 | Smith et al. |
| 20050111465 A1 | 5/26/2005 | Stewart |
| 20050226551 A1 | 10/13/2005 | Olaf, et al. |
| 20050275504 A1 | 12/15/2005 | Torza |
| 20060209816 A1 | 09/21/2006 | Li et al. |
| U.S. Pat. 3,993,871 | 11/23/1976 | Hjortendal et al. |
| U.S. Pat. 4,088,845 | 5/9/1978 | Lalanne, et al. |
| U.S. Pat. 4,231,017 | 10/28/1980 | Kiriyama |
| U.S. Pat. 4,394,541 | 7/19/1983 | Seiden |
| U.S. Pat. 5,276,425 | 1/4/1994 | Swanson, et al. |
| U.S. Pat. 5,408,231 | 4/18/1995 | Bowdon |
| U.S. Pat. 5,644,115 | 7/1/1997 | Knauer |
| U.S. Pat. 6,696,917 | 2/24/2004 | Heitner |
| U.S. Pat. 6,754,208 | 6/22/2004 | Kam |
| U.S. Pat. 6,795,432 | 9/21/2004 | Lee |
| U.S. Pat. 6901071B2 | 1/2/2003 | Lu |
| U.S. Pat. 6,914,902 | 7/5/2005 | Ayandeh |
| U.S. Pat. 6922790 B2 | 1/29/2004 | Smith et al. |

II. Non-Patent Literature Documents

Clos, Charles "A Study of Non-Blocking Switching Networks" (1952): 406-424 United States Provisional Patent filed Aug. 10, 2007; Ser. No. 60/955292; entitled "True Any to Any Cross-Connect Matrix with Reduced Cross-Connect Element Count"

Thus, the applicant(s) should be understood to have support to claim and make a statement of invention to at least: i) each of the switching devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, xiii) all inventions described herein, and for computer aspects and each aspect amenable to programming or other electronic automation, the applicant(s) should be understood to have support to claim and make a statement of invention to at least: xiv) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only limited claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. Clauses as potential statements of invention may include any of the following original presentations:

1. A path redundant, hardware efficient communications interconnect comprising:
    a first plurality of communication pathway capabilities;
    a second plurality of communication pathway capabilities;
    a plurality of commonality connectivity nodes indicative of an adjacent locality between a first communication pathway capability from at least one of said first plurality of communication pathway capabilities and a second communication pathway from at least one of said second plurality of communication pathway capabilities; and
    a plurality of fully unconstrained interconnect configured multiple alternative output switch capabilities active at least some of said commonality connectivity nodes, each multiple pathway switch capability configured to facilitate connection at one of said adjacent localities between said first communication pathway and at least said second communication pathway as one of said alternative switch outputs for said switch capability.
2. A path redundant, hardware efficient communications interconnect as described in claim 1 or any other claim wherein said plurality of fully unconstrained interconnect configured multiple alternative output switch capabilities and said plurality of commonality connectivity nodes are configured for any-to-any connectivity.

3. A path redundant, hardware efficient communications interconnect as described in claim 2 or any other claim and further comprising an any-to-any interconnect collective of sub arrays utilizing said plurality of commonality connectivity nodes and said plurality of multiple alternative output switch capabilities.

4. A path redundant, hardware efficient communications interconnect as described in claim 3 or any other claim wherein said first and second pluralities of communication pathways comprise input and output communication pathways and wherein any input and any output can be connected to any other pathway.

5. A path redundant, hardware efficient communications interconnect as described in claim 4 or any other claim wherein said any-to-any interconnect collective of sub arrays comprises a fully unconstrained interconnect collective.

6. A path redundant, hardware efficient communications interconnect as described in claim 3 or any other claim wherein said plurality of fully unconstrained interconnect configured multiple alternative output switch capabilities comprises at least one loop-back communication pathway switch capability.

7. A path redundant, hardware efficient communications interconnect as described in claim 1 or 3 or any other claim wherein said first and second pluralities of communication pathways each comprise electrical wire pathways.

8. A path redundant, hardware efficient communications interconnect as described in claim 7 or any other claim wherein said plurality of fully unconstrained interconnect configured multiple alternative output switch capabilities comprises at least one wired-or switch capability.

9. A path redundant, hardware efficient communications interconnect as described in claim 1 or any other claim wherein said first and second pluralities of communication pathways each comprise optical fiber pathways.

10. A path redundant, hardware efficient communications interconnect as described in claim 1 or any other claim wherein said first and second pluralities of communication pathways each comprise a signal pathway.

11. A path redundant, hardware efficient communications interconnect as described in claim 10 or any other claim wherein said signal pathway comprises at least one multiple signal accommodative signal pathway.

12. A path redundant, hardware efficient communications interconnect as described in claim 11 or any other claim wherein said multiple signal accommodative signal pathway comprises a multiple analog signal accommodative signal pathway.

13. A path redundant, hardware efficient communications interconnect as described in claim 11 or any other claim wherein said multiple signal accommodative signal pathway comprises a multiple digital signal accommodative signal pathway.

14. A path redundant, hardware efficient communications interconnect as described in claim 1 or any other claim wherein said plurality of fully unconstrained interconnect configured multiple alternative output switch capabilities comprises a plurality of double throw switches.

15. A path redundant, hardware efficient communications interconnect as described in claim 1 or any other claim wherein at least one of said fully unconstrained interconnect configured multiple alternative outputs comprises an unused switch output.

16. A path redundant, hardware efficient communications interconnect as described in claim 1 or any other claim wherein said fully unconstrained interconnect configured multiple alternative outputs comprise:
a first pathway from said second plurality of communication pathways; and
a second pathway from said second plurality of communication pathways.

17. A path redundant, hardware efficient communications interconnect as described in claim 1 or any other claim wherein said plurality of fully unconstrained interconnect configured multiple alternative output switch capabilities comprises a plurality of paired single throw switches.

18. A path redundant, hardware efficient communications interconnect as described in claim 3 or any other claim wherein said any-to-any interconnect collective of sub arrays comprises a plurality of single throw switches.

19. A path redundant, hardware efficient communications interconnect as described in claim 1 or any other claim wherein said plurality of fully unconstrained interconnect configured multiple alternative output switch capabilities comprises a plurality of multiple throw switches.

20. A path redundant, hardware efficient communications interconnect as described in claim 1, 3 or any other claim wherein said plurality of commonality connectivity nodes comprises a plurality of cross connect connectivity nodes.

21. A path redundant, hardware efficient communications interconnect as described in claim 3 or any other claim wherein said any-to-any interconnect collective of sub arrays comprises:
a plurality of double throw switches; and
a plurality of single throw switches.

22. A path redundant, hardware efficient communications interconnect as described in claim 21 or any other claim wherein said any-to-any interconnect collective of sub arrays comprises:
a plurality of exterior sub array double throw switches; and
a plurality of interior sub array single throw switches.

23. A path redundant, hardware efficient communications interconnect as described in claim 3 or any other claim wherein said any-to-any interconnect collective of sub arrays comprises at least one loop-back communication pathway switch capability.

24. An arbitrarily configurable communication interconnect comprising:
a first plurality of communication pathways;
a cross channel reconfigurable interconnect having a plurality of cross channel pathway connections;
a second plurality of communication pathways;
an interconnect connection locator responsive to at least said specified first communication pathway; and
a post-connection cross-connect topology configuration element to which said cross channel reconfigurable interconnect is configurationally responsive.

25. An arbitrarily configurable communication interconnect as described in claim 24 or any other claim wherein said first plurality of communication pathways comprises at least one arbitrarily connected communication pathway.

26. An arbitrarily configurable communication interconnect as described in claim 25 or any other claim wherein said second plurality of communication pathways comprises at least one arbitrarily connected communication pathway.

27. An arbitrarily configurable communication interconnect as described in claim 24 or 26 or any other claim and further comprising an interconnect connection locator responsive to said specified second communication pathway.
28. An arbitrarily configurable communication interconnect as described in claim 25 or 27 or any other claim wherein said post-connection cross-connect topology configuration element comprises an electrical connection configuration element.
29. An arbitrarily configurable communication interconnect as described in claim 24, 25, or 28 or any other claim wherein said first plurality of communication pathways comprise a plurality of input communication pathways.
30. An arbitrarily configurable communication interconnect as described in claim 24 or 29 wherein said second plurality of communication pathways comprises a plurality of output communication pathways.
31. An arbitrarily configurable communication interconnect as described in claim 24 or 25 or any other claim wherein said interconnect connection locator comprises a signal test element.
32. An arbitrarily configurable communication interconnect as described in claim 24 or 25 or any other claim wherein said interconnect connection locator comprises a connection documentation data entry.
33. An arbitrarily configurable communication interconnect as described in claim 24, 25, or 31 or any other claim wherein said post-connection cross-connect topology configuration element comprises a cross-connect switch controller.
34. An arbitrarily configurable communication interconnect as described in claim 24 or 33 or any other claim wherein said post-connection cross-connect topology configuration element comprises an automated cross-connect switch controller.
35. An arbitrarily configurable communication interconnect as described in claim 24 or any other claim wherein said post-connection cross-connect topology configuration element comprises a remote cross-connect configuration controller.
36. An arbitrarily configurable communication interconnect as described in claim 24 or any other claim and further comprising a cross-connect reconfiguration controller.
37. An arbitrarily configurable communication interconnect as described in claim 36 or any other claim wherein said cross-connect reconfiguration controller comprises a redundant cross-connect reconfiguration controller.
38. An arbitrarily configurable communication interconnect as described in claim 24, 25, 31, or 33 or any other claim wherein said post-connection cross-connect topology configuration element comprises a staged cross-connect interconnect controller.
39. An arbitrarily configurable communication interconnect as described in claim 24, 25, 31, 33, or 38 or any other claim wherein said post-connection cross-connect topology configuration element comprises a loop-back communication interconnect.
40. An arbitrarily configurable communication interconnect as described in claim 39 or any other claim wherein said loop-back communication interconnect comprises a noncenter stage loop-back communication interconnect.
41. An arbitrarily configurable communication interconnect as described in claim 39 or any other claim wherein said noncenter stage loop-back communication interconnect comprises a side stage loop-back communication interconnect.
42. An arbitrarily configurable communication interconnect as described in claim 41 or any other claim wherein said side stage loop-back communication interconnect comprises an outer side stage loop-back communication interconnect.
43. An arbitrarily configurable communication interconnect as described in claim 39 or any other claim wherein said loop-back communication interconnect comprises a center stage loop-back communication interconnect.
44. An arbitrarily configurable communication interconnect as described in claim 39, 41, 42, or 43 or any other claim wherein said loop-back communication interconnect comprises a partial pathway consumptive loop-back communication interconnect.
45. An arbitrarily configurable communication interconnect as described in claim 44 or any other claim wherein said partial pathway consumptive loop-back communication interconnect comprises a partial sub array pathway loop-back communication interconnect.
46. An arbitrarily configurable communication interconnect as described in claim 24 or 44 or any other claim wherein said post-connection cross-connect topology configuration element comprises a truncated throughput interior sub array pathway.
47. An arbitrarily configurable communication interconnect as described in claim 46 or any other claim wherein said truncated throughput interior sub array pathway comprises a truncated cross sub array pathway.
48. An arbitrarily configurable communication interconnect as described in claim 46 or 47 or any other claim wherein said truncated throughput interior sub array pathway comprises a truncated forward sub array pathway.
49. An arbitrarily configurable communication interconnect as described in claim 46 or any other claim wherein said truncated throughput interior sub array pathway comprises a wired-or alternative communication pathway.
50. An arbitrarily configurable communication interconnect as described in claim 49 or any other claim wherein said wired-or alternative communication pathway comprises at least one double throw switch.
51. A balanced redundancy cross-connect communications interconnect comprising:
a first plurality of communication pathway capabilities;
a collective of superfluous capability side stage sub arrays responsive to at least one of said first plurality of communication pathway capabilities;
a collective of balanced connectivity side stage sub arrays responsive to said collective of superfluous capability side stage sub arrays;
a collective of center stage sub arrays capable of transmitting a communication; and
a second plurality of communication pathway capabilities at least one of which is capable of being communicationally responsive to at least one of said first plurality of communication pathway capabilities.
52. A balanced redundancy cross-connect communications interconnect as described in claim 51 or any other claim wherein said collective of superfluous capability side stage sub arrays comprises a collective of superfluous capability outer side stage sub arrays.
53. A balanced redundancy cross-connect communications interconnect as described in claim 52 or any other claim wherein said collective of balanced connectivity side stage sub arrays comprises a collective of balanced connectivity inner side stage sub arrays.
54. A balanced redundancy cross-connect communications interconnect as described in claim 51 or any other claim wherein said collective of superfluous capability side stage sub arrays comprises:

a first collective of superfluous capability side stage sub arrays; and
a second collective of superfluous capability side stage sub arrays.

55. A balanced redundancy cross-connect communications interconnect as described in claim 54 or any other claim wherein said first collective of superfluous capability side stage sub arrays comprises a first stage collective of superfluous capability outer side stage sub arrays, and wherein said second collective of superfluous capability side stage sub arrays comprises a fifth stage collective of superfluous capability outer side stage sub arrays.

56. A balanced redundancy cross-connect communications interconnect as described in claim 51, 54, or 55 or any other claim wherein said collective of balanced connectivity side stage sub arrays comprises:
a first collective of balanced connectivity side stage sub arrays; and
a second collective of balanced connectivity side stage sub arrays.

57. A balanced redundancy cross-connect communications interconnect as described in claim 56 or any other claim wherein said first collective of balanced connectivity side stage sub arrays comprises a second stage collective of balanced connectivity inner side stage sub arrays, and wherein said second collective of balanced connectivity side stage sub arrays comprises a fourth stage collective of balanced connectivity inner side stage sub arrays.

58. A balanced redundancy cross-connect communications interconnect as described in claim 51, 56, or 57 or any other claim wherein said collective of superfluous capability side stage sub arrays comprises a collective of asymmetric side stage sub arrays.

59. A balanced redundancy cross-connect communications interconnect as described in claim 51 or 58 or any other claim wherein said collective of balanced connectivity side stage sub arrays comprises a collective of symmetric side stage sub arrays.

60. A balanced redundancy cross-connect communications interconnect as described in claim 51 or any other claim wherein said collective of superfluous capability side stage sub arrays comprises a collective of single excess increment sub arrays.

61. A balanced redundancy cross-connect communications interconnect as described in claim 59 or 60 or any other claim wherein said collective of balanced connectivity side stage sub arrays comprises a collective of symmetric inner side stage sub arrays.

62. A balanced redundancy cross-connect communications interconnect as described in claim 61 or any other claim wherein said collective of symmetric inner side stage sub arrays comprises a collective of three-by-three inner side stage sub arrays.

63. A balanced redundancy cross-connect communications interconnect as described in claim 51, 60, or 62 or any other claim wherein said collective of superfluous capability side stage sub arrays and said collective of balanced connectivity side stage sub arrays each comprise a collective of bilateral sub arrays.

64. A balanced redundancy cross-connect communications interconnect as described in claim 51 or 60 or any other claim wherein said collective of balanced connectivity side stage sub arrays comprises a collective of symmetric bilateral inner side stage sub arrays.

65. A balanced redundancy cross-connect communications interconnect as described in claim 51, 60, or 64 or any other claim wherein said collective of superfluous capability side stage sub arrays comprises a collective of asymmetric bilateral outer side stage sub arrays.

66. A balanced redundancy cross-connect communications interconnect as described in claim 51, 63, 64, or 65 or any other claim wherein said collective of center stage sub arrays comprises a collective of quadrilateral center stage sub arrays.

67. A balanced redundancy cross-connect communications interconnect as described in claim 65 or any other claim wherein said collective of center stage sub arrays comprises a collective of symmetric quadrilateral center stage sub arrays.

68. A communications interconnect as described in claim 51 or 24 and further comprising a plurality of fully unconstrained interconnect configured multiple alternative output switch capabilities.

69. A communications interconnect as described in claim 68 and further comprising:
a first plurality of communication pathway capabilities; and
a second plurality of communication pathway capabilities.

70. A communications interconnect as described in claim 69 and further comprising a plurality of commonality connectivity nodes indicative of an adjacent locality between a first communication pathway capability from at least one of said first plurality of communication pathway capabilities and a second communication pathway from at least one of said second plurality of communication pathway capabilities.

71. A communications interconnect as described in claim 68 or any other claim wherein said plurality of fully unconstrained interconnect configured multiple alternative output switch capabilities and said plurality of commonality connectivity nodes are configured for any-to-any connectivity.

72. A communications interconnect as described in claim 68 or any other claim and further comprising an any-to-any interconnect collective of sub arrays utilizing said plurality of commonality connectivity nodes and said plurality of multiple alternative output switch capabilities.

73. A communications interconnect as described in claim 72 or any other claim wherein said first and second pluralities of communication pathways comprise input and output communication pathways and wherein any input and any output can be connected to any other pathway.

74. A communications interconnect as described in claim 73 or any other claim wherein said any-to-any interconnect collective of sub arrays comprises a fully unconstrained interconnect collective.

75. A communications interconnect as described in claim 72 or any other claim wherein said plurality of fully unconstrained interconnect configured multiple alternative output switch capabilities comprises at least one loop-back communication pathway switch capability.

76. A communications interconnect as described in claim 69 or 72 or any other claim wherein said first and second pluralities of communication pathways each comprise electrical wire pathways.

77. A communications interconnect as described in claim 76 or any other claim wherein said plurality of fully unconstrained interconnect configured multiple alternative output switch capabilities comprises at least one wired-or switch capability.

78. A communications interconnect as described in claim 69 or any other claim wherein said first and second pluralities of communication pathways each comprise optical fiber pathways.

79. A communications interconnect as described in claim 69 or any other claim wherein said first and second pluralities of communication pathways each comprise a signal pathway.

80. A communications interconnect as described in claim 79 or any other claim wherein said signal pathway comprises at least one multiple signal accommodative signal pathway.

81. A communications interconnect as described in claim 80 or any other claim wherein said multiple signal accommodative signal pathway comprises a multiple analog signal accommodative signal pathway.

82. A communications interconnect as described in claim 80 or any other claim wherein said multiple signal accommodative signal pathway comprises a multiple digital signal accommodative signal pathway.

83. A communications interconnect as described in claim 68 or any other claim wherein said plurality of fully unconstrained interconnect configured multiple alternative output switch capabilities comprises a plurality of double throw switches.

84. A communications interconnect as described in claim 68 or any other claim wherein at least one of said fully unconstrained interconnect configured multiple alternative outputs comprises an unused switch output.

85. A communications interconnect as described in claim 68 or any other claim wherein said fully unconstrained interconnect configured multiple alternative outputs comprise:
a first pathway from said second plurality of communication pathways; and
a second pathway from said second plurality of communication pathways.

86. A communications interconnect as described in claim 68 or any other claim wherein said plurality of fully unconstrained interconnect configured multiple alternative output switch capabilities comprises a plurality of paired single throw switches.

87. A communications interconnect as described in claim 72 or any other claim wherein said any-to-any interconnect collective of sub arrays comprises a plurality of single throw switches.

88. A communications interconnect as described in claim 68 or any other claim wherein said plurality of fully unconstrained interconnect configured multiple alternative output switch capabilities comprises a plurality of multiple throw switches.

89. A communications interconnect as described in claim 70 or any other claim wherein said plurality of commonality connectivity nodes comprises a plurality of cross connect connectivity nodes.

90. A communications interconnect as described in claim 72 or any other claim wherein said any-to-any interconnect collective of sub arrays comprises:
a plurality of double throw switches; and
a plurality of single throw switches.

91. A communications interconnect as described in claim 90 or any other claim wherein said any-to-any interconnect collective of sub arrays comprises:
a plurality of exterior sub array double throw switches; and
a plurality of interior sub array single throw switches.

92. A communications interconnect as described in claim 72 or any other claim wherein said any-to-any interconnect collective of sub arrays comprises at least one loop-back communication pathway switch capability.

93. A communication interconnect as described in claim 24 or 1 or any other claim and further comprising an interconnect connection locator responsive to at least said specified first communication pathway.

94. A communication interconnect as described in claim 93 or any other claim and further comprising a post-connection cross-connect topology configuration element.

95. A communication interconnect as described in claim 93 or any other claim wherein said first plurality of communication pathways comprises at least one arbitrarily connected communication pathway.

96. A communication interconnect as described in claim 95 or any other claim wherein said second plurality of communication pathways comprises at least one arbitrarily connected communication pathway.

97. A communication interconnect as described in claim 93 or 96 or any other claim and further comprising an interconnect connection locator responsive to said specified second communication pathway.

98. A communication interconnect as described in claim 95 or 97 or any other claim wherein said post-connection cross-connect topology configuration element comprises an electrical connection configuration element.

99. A communication interconnect as described in claim 94, 95, or 98 or any other claim wherein said first plurality of communication pathways comprise a plurality of input communication pathways.

100. A communication interconnect as described in claim 94 or 99 wherein said second plurality of communication pathways comprises a plurality of output communication pathways.

101. A communication interconnect as described in claim 94 or 95 or any other claim wherein said interconnect connection locator comprises a signal test element.

102. A communication interconnect as described in claim 94 or 95 or any other claim wherein said interconnect connection locator comprises a connection documentation data entry.

103. A communication interconnect as described in claim 94, 95, or 101 or any other claim wherein said post-connection cross-connect topology configuration element comprises a cross-connect switch controller.

104. A communication interconnect as described in claim 91 or 103 or any other claim wherein said post-connection cross-connect topology configuration element comprises an automated cross-connect switch controller.

105. A communication interconnect as described in claim 94 or any other claim wherein said post-connection cross-connect topology configuration element comprises a remote cross-connect configuration controller.

106. A communication interconnect as described in claim 94 or any other claim and further comprising a cross-connect reconfiguration controller.

107. A communication interconnect as described in claim 106 or any other claim wherein said cross-connect reconfiguration controller comprises a redundant cross-connect reconfiguration controller.

108. A communication interconnect as described in claim 94, 95, 101, or 103 or any other claim wherein said post-connection cross-connect topology configuration element comprises a staged cross-connect interconnect controller.

109. A communication interconnect as described in claim 94, 95, 101, 103, or 108 or any other claim wherein said post-connection cross-connect topology configuration element comprises a loop-back communication interconnect.

110. A communication interconnect as described in claim 109 or any other claim wherein said loop-back communication interconnect comprises a noncenter stage loop-back communication interconnect.

111. A communication interconnect as described in claim 109 or any other claim wherein said noncenter stage loop-back communication interconnect comprises a side stage loop-back communication interconnect.

112. A communication interconnect as described in claim 111 or any other claim wherein said side stage loop-back communication interconnect comprises an outer side stage loop-back communication interconnect.

113. A communication interconnect as described in claim 109 or any other claim wherein said loop-back communication interconnect comprises a center stage loop-back communication interconnect.

114. A communication interconnect as described in claim 109, 111, 112, or 113 or any other claim wherein said loop-back communication interconnect comprises a partial pathway consumptive loop-back communication interconnect.

115. A communication interconnect as described in claim 114 or any other claim wherein said partial pathway consumptive loop-back communication interconnect comprises a partial sub array pathway loop-back communication interconnect.

116. A communication interconnect as described in claim 94 or 114 or any other claim wherein said post-connection cross-connect topology configuration element comprises a truncated throughput interior sub array pathway.

117. A communication interconnect as described in claim 116 or any other claim wherein said truncated throughput interior sub array pathway comprises a truncated cross sub array pathway.

118. A communication interconnect as described in claim 116 or 117 or any other claim wherein said truncated throughput interior sub array pathway comprises a truncated forward sub array pathway.

119. A communication interconnect as described in claim 116 or any other claim wherein said truncated throughput interior sub array pathway comprises a wired-or alternative communication pathway.

120. A communication interconnect as described in claim 119 or any other claim wherein said wired-or alternative communication pathway comprises at least one double throw switch.

121. A communications interconnect as described in claim 24 or 1 or any other claim and further comprising:
a collective of superfluous capability side stage sub arrays;
a collective of balanced connectivity side stage sub arrays; and
a collective of center stage sub arrays.

122. A communications interconnect as described in claim 121 or any other claim and further comprising:
a first plurality of communication pathway capabilities; and
a second plurality of communication pathway capabilities at least one of which is capable of being communicationally responsive to at least one of said first plurality of communication pathway capabilities.

123. A communications interconnect as described in claim 122 or any other claim wherein said collective of superfluous capability side stage sub arrays comprises a collective of superfluous capability outer side stage sub arrays.

124. A communications interconnect as described in claim 123 or any other claim wherein said collective of balanced connectivity side stage sub arrays comprises a collective of balanced connectivity inner side stage sub arrays.

125. A communications interconnect as described in claim 122 or any other claim wherein said collective of superfluous capability side stage sub arrays comprises:
a first collective of superfluous capability side stage sub arrays; and
a second collective of superfluous capability side stage sub arrays.

126. A communications interconnect as described in claim 125 or any other claim wherein said first collective of superfluous capability side stage sub arrays comprises a first stage collective of superfluous capability outer side stage sub arrays, and wherein said second collective of superfluous capability side stage sub arrays comprises a fifth stage collective of superfluous capability outer side stage sub arrays.

127. A communications interconnect as described in claim 122, 125, or 126 or any other claim wherein said collective of balanced connectivity side stage sub arrays comprises:
a first collective of balanced connectivity side stage sub arrays; and
a second collective of balanced connectivity side stage sub arrays.

128. A communications interconnect as described in claim 127 or any other claim wherein said first collective of balanced connectivity side stage sub arrays comprises a second stage collective of balanced connectivity inner side stage sub arrays, and wherein said second collective of balanced connectivity side stage sub arrays comprises a fourth stage collective of balanced connectivity inner side stage sub arrays.

129. A communications interconnect as described in claim 122, 127, or 128 or any other claim wherein said collective of superfluous capability side stage sub arrays comprises a collective of asymmetric side stage sub arrays.

130. A communications interconnect as described in claim 122 or 129 or any other claim wherein said collective of balanced connectivity side stage sub arrays comprises a collective of symmetric side stage sub arrays.

131. A communications interconnect as described in claim 122 or any other claim wherein said collective of superfluous capability side stage sub arrays comprises a collective of single excess increment sub arrays.

132. A communications interconnect as described in claim 130 or 131 or any other claim wherein said collective of balanced connectivity side stage sub arrays comprises a collective of symmetric inner side stage sub arrays.

133. A communications interconnect as described in claim 132 or any other claim wherein said collective of symmetric inner side stage sub arrays comprises a collective of three-by-three inner side stage sub arrays.

134. A communications interconnect as described in claim 122, 131, or 133 or any other claim wherein said collective of superfluous capability side stage sub arrays and said collective of balanced connectivity side stage sub arrays each comprise a collective of bilateral sub arrays.

135. A communications interconnect as described in claim 122 or 131 or any other claim wherein said collective of balanced connectivity side stage sub arrays comprises a collective of symmetric bilateral inner side stage sub arrays.

136. A communications interconnect as described in claim 122, 131, or 135 or any other claim wherein said collective of superfluous capability side stage sub arrays comprises a collective of asymmetric bilateral outer side stage sub arrays.

137. A communications interconnect as described in claim 122, 134, 135, or 136 or any other claim wherein said collective of center stage sub arrays comprises a collective of quadrilateral center stage sub arrays.
138. A communications interconnect as described in claim 136 or any other claim wherein said collective of center stage sub arrays comprises a collective of symmetric quadrilateral center stage sub arrays.
139. A communications interconnect as described in claim 51, 24 or 1 or any other claim and further comprising a collective of three-by-three connectivity side stage sub arrays.
140. A communications interconnect as described in claim 139 or any other claim and further comprising a collective of three-by-four connectivity side stage sub arrays.
141. A communications interconnect as described in claim 139 or 140 or any other claim and further comprising:
a collective of side stage sub arrays having a side connectivity size; and
a collective of larger connectivity center stage sub arrays having a center connectivity size that is larger than said side connectivity size.
142. A communications interconnect as described in claim 51, 24 or 1 or any other claim and further comprising a collective of integer averaged natural logarithm based connectivity side stage sub arrays.
143. A communications interconnect as described in claim 51, 24 or 1 or any other claim and further comprising:
a collective of side stage sub arrays having a side connectivity size; and
a collective of larger connectivity center stage sub arrays having a center connectivity size that is larger than said side connectivity size.
144. A communications interconnect as described in claim 51, 24 or 1 or any other claim and further comprising a collective of six-by-six connectivity center stage sub arrays.
145. A communications interconnect as described in claim 144 or any other claim and further comprising a collective of three-by-four connectivity side stage sub arrays.
146. A communications interconnect as described in claim 144 or 145 or any other claim and further comprising:
a collective of side stage sub arrays having a side connectivity size; and
a collective of larger connectivity center stage sub arrays having a center connectivity size that is larger than said side connectivity size.
147. A communications interconnect as described in claim 51, 24 or 1 or any other claim and further comprising a collective of twelve-by-twelve connectivity center stage sub arrays.
148. A communications interconnect as described in claim 147 or any other claim and further comprising a collective of three-by-four connectivity side stage sub arrays.
149. A communications interconnect as described in claim 147 or 148 or any other claim and further comprising:
a collective of side stage sub arrays having a side connectivity size; and
a collective of larger connectivity center stage sub arrays having a center connectivity size that is larger than said side connectivity size.
150. A communications interconnect as described in claim 51, 24 or 1 or any other claim and further comprising a collective of exterior sub array multiple alternative output switch capabilities.
151. A communications interconnect as described in claim 51, 24 or 1 or any other claim and further comprising a collective of quadrilateral center stage sub arrays.
152. A communications interconnect as described in claim 151 or any other claim and further comprising a collective of bilateral side stage sub arrays.
153. A communications interconnect as described in claim 51, 24, 1, or 152 or any other claim and further comprising a collective of staged sub arrays.
154. A communications interconnect as described in claim 51, 24, or 1 or any other claim and further comprising a collective of modular sub arrays.
155. A communications interconnect as described in claim 154 or any other claim and further comprising a collective of three-by-three connectivity side stage sub arrays.
156. A communications interconnect as described in claim 154 or any other claim and further comprising a collective of three-by-four connectivity side stage sub arrays.
157. A communications interconnect as described in claim 154 or 156 or any other claim and further comprising a collective of three-by-four connectivity side stage sub arrays.
158. A communications interconnect as described in claim 154 or 156 or any other claim and further comprising a collective of six-by-six connectivity center stage sub arrays.
159. A communications interconnect as described in claim 154 or 156 or any other claim and further comprising a collective of twelve-by-twelve connectivity center stage sub arrays.
160. A communication interconnect as described in claim 1, 24, or 51 or any other claim and further comprising a loop-back communication interconnect.
161. A communication interconnect as described in claim 160 or any other claim wherein said loop-back communication interconnect comprises a noncenter stage loop-back communication interconnect.
162. A communication interconnect as described in claim 160 or any other claim wherein said noncenter stage loop-back communication interconnect comprises a side stage loop-back communication interconnect.
163. A communication interconnect as described in claim 162 or any other claim wherein said side stage loop-back communication interconnect comprises an outer side stage loop-back communication interconnect.
164. A communication interconnect as described in claim 160 or any other claim wherein said loop-back communication interconnect comprises a center stage loop-back communication interconnect.
165. A communication interconnect as described in claim 160, 162, 163, or 164 or any other claim wherein said loop-back communication interconnect comprises a partial pathway consumptive loop-back communication interconnect.
166. A communication interconnect as described in claim 165 or any other claim wherein said partial pathway consumptive loop-back communication interconnect comprises a partial sub array pathway loop-back communication interconnect.
167. A communication interconnect as described in claim 94 or 165 or any other claim wherein said post-connection cross-connect topology configuration element comprises a truncated throughput interior sub array pathway.
168. A communication interconnect as described in claim 167 or any other claim wherein said truncated throughput interior sub array pathway comprises a truncated cross sub array pathway.

169. A communication interconnect as described in claim 1, 24, or 51 or any other claim and further comprising at least one interleaved sub array.

170. A communication interconnect as described in claim 1, 24, or 51 or any other claim and further comprising a collective of interleaved center sub arrays.

171. A communication interconnect as described in claim 1, 24, or 51 or any other claim and further comprising a resource-efficient interconnect.

172. A communication interconnect as described in claim 171 or any other claim wherein said resource-efficient interconnect has a plurality of switch capabilities, a plurality of input-capable connection locales, and a plurality of output-capable connection locales, and having resource efficiency selected from a group consisting of:
the number of switch capabilities being less than about two percent of an input-output product value for said interconnect,
the number of switch capabilities being less than about two percent of an input-output product value for an interconnect having a similar input-output product value,
the number of switch capabilities being less than about two percent of an input-output product value of greater than about twenty thousand for said interconnect,
the number of switch capabilities being less than about two percent of an input-output product value for a multi stage interconnect,
the number of switch capabilities being less than about two percent of an input-output product value of greater than about twenty thousand for a fifteen stage interconnect,
the number of switch capabilities being less than about one percent of an input-output product value for said interconnect,
the number of switch capabilities being less than about one percent of an input-output product value for an interconnect having a similar input-output product value,
the number of switch capabilities being less than about one percent of an input-output product value of greater than about twenty thousand for said interconnect,
the number of switch capabilities being less than about one percent of an input-output product value for a multi stage interconnect,
the number of switch capabilities being less than about one percent of an input-output product value of greater than about twenty thousand for a fifteen stage interconnect,
the number of switch capabilities being less than about one-half percent of an input-output product value for said interconnect,
the number of switch capabilities being less than about one-half percent of an input-output product value for an interconnect having a similar input-output product value,
the number of switch capabilities being less than about one-half percent of an input-output product value of greater than about twenty thousand for said interconnect,
the number of switch capabilities being less than about one-half percent of an input-output product value for a multi stage interconnect,
the number of switch capabilities being less than about one-half percent of an input-output product value of greater than about twenty thousand for a fifteen stage interconnect,
the number of switch capabilities being less than about three tenths percent of an input-output product value for said interconnect,
the number of switch capabilities being less than about three tenths percent of an input-output product value for an interconnect having a similar input-output product value,
the number of switch capabilities being less than about three tenths percent of an input-output product value of greater than about twenty thousand for said interconnect,
the number of switch capabilities being less than about three tenths percent of an input-output product value for a multi stage interconnect,
the number of switch capabilities being less than about three tenths percent of an input-output product value of greater than about twenty thousand for a fifteen stage interconnect,
better than a traditional network switch capability to input-output product value efficiency,
better than a Clos network switch capability to input-output product value efficiency,
better than a Benes network switch capability to input-output product value efficiency,
better than a traditional network switch capability to input-output product value efficiency for an interconnect having a similar input-output product value,
better than a Clos network switch capability to input-output product value efficiency for an interconnect having a similar input-output product value,
better than a Benes network switch capability to input-output product value efficiency for an interconnect having a similar input-output product value,
a resource efficiency ratio that is greater than about two for a traditional network switch capability input-output product efficiency value,
a resource efficiency ratio that is greater than about two for a Clos network switch capability input-output product efficiency value, and
a resource efficiency ratio that is greater than about two for a Benes network switch capability input-output product efficiency value.

173. A communication interconnect as described in claim 1, 24, or 51 or any other claim and further comprising a make-before-break configured collective of sub arrays.

174. A communications interconnect as described in claim 173 or any other claim wherein said make-before-break configured collective of sub arrays comprises a collective of superfluous capability outer side stage sub arrays.

175. A communications interconnect as described in claim 174 or any other claim and further comprising a collective of three-by-three connectivity side stage sub arrays.

176. A communications interconnect as described in claim 175 or any other claim and further comprising a collective of three-by-four connectivity side stage sub arrays.

177. A communications interconnect as described in claim 176 or any other claim and further comprising:
a collective of side stage sub arrays having a side connectivity size; and
a collective of larger connectivity center stage sub arrays having a center connectivity size that is larger than said side connectivity size.

178. A method of hardware efficient communication interconnection comprising the steps of:
accepting a first plurality of communication pathways, each having an individual connection locale;
accepting a second plurality of communication pathways, each also having an individual connection locale;
multiple alternative output switching between any two of said individual connection locales; and establishing a fully unconstrained interconnect between said any two of said individual connection locales.

179. A method of hardware efficient communication interconnection as described in claim 178 or any other claim wherein said step of establishing a fully unconstrained interconnect between said any two of said individual connection locales comprises the step of configuring an any-to-any interconnect.

180. A method of hardware efficient communication interconnection as described in claim 179 or any other claim and further comprising the step of any-to-any interconnect switching a collective of sub arrays having at least one multiple alternative output switch capability.

181. A method of hardware efficient communication interconnection as described in claim 180 or any other claim wherein said steps of accepting first and second pluralities of communication pathways comprise the steps of accepting input and output communication pathways and wherein said step of establishing a fully unconstrained interconnect comprises the step of connecting any input and any output to any other pathway.

182. A method of hardware efficient communication interconnection as described in claim 181 or any other claim wherein said step of accepting a first plurality of communication pathways, each having an individual connection locale comprises the step of undesignated locale connecting at least one first communication pathway.

183. A method of hardware efficient communication interconnection as described in claim 182 or any other claim wherein said step of accepting a second plurality of communication pathways, each having an individual connection locale comprises the step of undesignated locale connecting at least one second communication pathway.

184. A method of hardware efficient communication interconnection as described in claim 180 or any other claim wherein said step of multiple alternative output switching between any two of said individual connection locales comprises the step of loop-back switching.

185. A method of hardware efficient communication interconnection as described in claim 178 or 180 or any other claim wherein said step of establishing a fully unconstrained interconnect comprises the step of electrically connecting any two of said individual connection locales.

186. A method of hardware efficient communication interconnection as described in claim 185 or any other claim wherein said step of multiple alternative output switching comprises the step of wired-or switching.

187. A method of hardware efficient communication interconnection as described in claim 178 or any other claim wherein said step of establishing a fully unconstrained interconnect comprises the step of optically connecting any two of said individual connection locales.

188. A method of hardware efficient communication interconnection as described in claim 178 or any other claim wherein said step of establishing a fully unconstrained interconnect comprises the step of signal pathway connecting any two of said individual connection locales.

189. A method of hardware efficient communication interconnection as described in claim 188 or any other claim wherein said step of establishing a fully unconstrained interconnect comprises the step of accommodating a multiple signal pathway.

190. A method of hardware efficient communication interconnection as described in claim 189 or any other claim wherein said step of accommodating a multiple signal pathway comprises the step of accommodating a multiple analog signal pathway.

191. A method of hardware efficient communication interconnection as described in claim 189 or any other claim wherein said step of accommodating a multiple signal pathway comprises the step of accommodating a multiple digital signal pathway.

192. A method of hardware efficient communication interconnection as described in claim 178 or any other claim wherein said step of multiple alternative output switching comprises the step of configuring at least one double throw switch.

193. A method of hardware efficient communication interconnection as described in claim 178 or any other claim wherein said step of multiple alternative output switching comprises the step of permitting an unused switch output.

194. A method of hardware efficient communication interconnection as described in claim 178 or any other claim wherein said step of multiple alternative output switching comprises the step of establishing an alternative pathway between said two individual connection locales.

195. A method of hardware efficient communication interconnection as described in claim 178 or any other claim wherein said step of multiple alternative output switching comprises the step of configuring at least one pair of single throw switches.

196. A method of hardware efficient communication interconnection as described in claim 180 or any other claim wherein said step of any-to-any interconnect switching a collective of sub arrays comprises the step of configuring a plurality of single throw switches.

197. A method of hardware efficient communication interconnection as described in claim 178 or any other claim wherein said step of multiple alternative output switching comprises the step of configuring at least one multiple throw switch.

198. A method of hardware efficient communication interconnection as described in claim 180 or any other claim wherein said step of any-to-any interconnect switching a collective of sub arrays comprises the steps of:
configuring a plurality of double throw switches; and
configuring a plurality of single throw switches.

199. A method of hardware efficient communication interconnection as described in claim 198 or any other claim wherein said step of any-to-any interconnect switching a collective of sub arrays comprises the steps of:
configuring a plurality of exterior sub array double throw switches; and
configuring a plurality of interior sub array single throw switches.

200. A method of hardware efficient communication interconnection as described in claim 180 or any other claim wherein said step of any-to-any interconnect switching a collective of sub arrays comprises the step of configuring a loop-back communication pathway.

201. A method of establishing a configurable connection between communication pathways comprising the steps of:
accepting a first plurality of communication pathways;
establishing a cross channel reconfigurable interconnect having a plurality of cross channel pathway connections;
accepting a second plurality of communication pathways;
arbitrarily connecting at least one specified first communication pathway responsive to said cross channel reconfigurable interconnect;
connecting at least one specified second communication pathway responsive to said cross channel reconfigurable interconnect;

determining an interconnect connection location for said specified first communication pathway;
configuring a cross-connect topology between said specified first communication pathway and said specified second communication pathway; and
communicating between said specified first communication pathway and said specified second communication pathway.

202. A method of establishing a configurable connection between communication pathways as described in claim 201 or any other claim wherein said step of connecting at least one specified second communication pathway responsive to said cross channel reconfigurable interconnect comprises the step of arbitrarily connecting at least one specified second communication pathway responsive to said cross channel reconfigurable interconnect.

203. A method of establishing a configurable connection between communication pathways as described in claim 201 or 202 or any other claim and further comprising the step of determining an interconnect connection location for said specified second communication pathway.

204. A method of establishing a configurable connection between communication pathways as described in claim 201 or 203 or any other claim wherein said step of arbitrarily connecting at least one specified first communication pathway responsive to said cross channel reconfigurable interconnect is accomplished before said step of determining an interconnect connection location for said specified first communication pathway.

205. A method of establishing a configurable connection between communication pathways as described in claim 204 or any other claim wherein said step of determining an interconnect connection location for said specified first communication pathway is accomplished before said step of configuring a cross-connect topology between said specified first communication pathway and said specified second communication pathway.

206. A method of establishing a configurable connection between communication pathways as described in claim 203 or any other claim wherein said step of connecting at least one specified second communication pathway responsive to said cross channel reconfigurable interconnect is accomplished before said step of determining an interconnect connection location for said specified second communication pathway.

207. A method of establishing a configurable connection between communication pathways as described in claim 206 or any other claim wherein said step of determining an interconnect connection location for said specified second communication pathway is accomplished before said step of configuring a cross-connect topology between said specified first communication pathway and said specified second communication pathway.

208. A method of establishing a configurable connection between communication pathways as described in claim 205 or 207 or any other claim wherein said step of configuring a cross-connect topology between said specified first communication pathway and said specified second communication pathway comprises the step of electrically connecting said specified first communication pathway and said specified second communication pathway.

209. A method of establishing a configurable connection between communication pathways as described in claim 201, 202, 207 or 208 or any other claim wherein said step of accepting a first plurality of communication pathways comprises the step of accepting a plurality of input communication pathways.

210. A method of establishing a configurable connection between communication pathways as described in claim 201 or 209 wherein said step of accepting a second plurality of communication pathways comprises the step of accepting a plurality of output communication pathways.

211. A method of establishing a configurable connection between communication pathways as described in claim 201 or 202 or any other claim wherein said steps of determining an interconnect connection location for said specified first communication pathway comprises the step of signal testing a communication pathway.

212. A method of establishing a configurable connection between communication pathways as described in claim 203 or any other claim wherein said step of determining an interconnect connection location for said specified second communication pathway comprises the step of signal testing a communication pathway.

213. A method of establishing a configurable connection between communication pathways as described in claim 201 or any other claim wherein said steps of determining an interconnect connection location for said specified first communication pathway comprises the step of utilizing connection documentation data in configuring said cross-connect topology between said specified first communication pathway and said specified second communication pathway.

214. A method of establishing a configurable connection between communication pathways as described in claim 203 or any other claim wherein said step of determining an interconnect connection location for said specified second communication pathway comprises the step of utilizing connection documentation data in configuring said cross-connect topology between said specified first communication pathway and said specified second communication pathway.

215. A method of establishing a configurable connection between communication pathways as described in claim 201, 202, 211 or 212 or any other claim wherein said step of configuring a cross-connect topology between said specified first communication pathway and said specified second communication pathway comprises the step of switching a cross-connect topology between said specified first communication pathway and said specified second communication pathway.

216. A method of establishing a configurable connection between communication pathways as described in claim 201 or 215 or any other claim wherein said step of configuring a cross-connect topology between said specified first communication pathway and said specified second communication pathway comprises the step of automatically configuring a cross-connect topology between said specified first communication pathway and said specified second communication pathway.

217. A method of establishing a configurable connection between communication pathways as described in claim 201 or any other claim wherein said step of configuring a cross-connect topology between said specified first communication pathway and said specified second communication pathway comprises the step of remotely configuring a cross-connect topology between said specified first communication pathway and said specified second communication pathway.

218. A method of establishing a configurable connection between communication pathways as described in claim 201 or any other claim and further comprising the step of reconfiguring a cross-connect topology between said specified first communication pathway and said specified second communication pathway.
219. A method of establishing a configurable connection between communication pathways as described in claim 218 or any other claim wherein said step of reconfiguring a cross-connect topology between said specified first communication pathway and said specified second communication pathway comprises the step of utilizing a redundant configuration cross-connect topology between said specified first communication pathway and said specified second communication pathway.
220. A method of establishing a configurable connection between communication pathways as described in claim 201 or any other claim wherein said step of arbitrarily connecting at least one specified first communication pathway responsive to said cross channel reconfigurable interconnect comprises the step of fully unconstrained selecting a connection location for said at least one specified first communication pathway.
221. A method of establishing a configurable connection between communication pathways as described in claim 202 or 220 or any other claim wherein said step of arbitrarily connecting at least one specified second communication pathway responsive to said cross channel reconfigurable interconnect comprises the step of fully unconstrained selecting a connection location for said at least one specified second communication pathway.
222. A method of establishing a configurable connection between communication pathways as described in claim 201, 202, 211, 212, 215, 220 or 221 or any other claim wherein said step of configuring a cross-connect topology between said specified first communication pathway and said specified second communication pathway comprises the step of configuring a staged cross-connect topology between said specified first communication pathway and said specified second communication pathway.
223. A method of establishing a configurable connection between communication pathways as described in claim 222 or any other claim wherein said step of configuring a staged cross-connect topology between said specified first communication pathway and said specified second communication pathway comprises the step of configuring only side stage cross-connect topology between said specified first communication pathway and said specified second communication pathway.
224. A method of establishing a configurable connection between communication pathways as described in claim 222 or any other claim wherein said step of configuring a staged cross-connect topology between said specified first communication pathway and said specified second communication pathway comprises the step of configuring a center stage loop-back interconnect communication pathway between said specified first communication pathway and said specified second communication pathway.
225. A method of establishing a configurable connection between communication pathways as described in claim 201, 202, 211, 212, 215, 220, 221, or 222 or any other claim wherein said step of configuring a cross-connect topology between said specified first communication pathway and said specified second communication pathway comprises the step of configuring a loop-back communication pathway between said specified first communication pathway and said specified second communication pathway.
226. A method of establishing a configurable connection between communication pathways as described in claim 225 or any other claim wherein said step of configuring a loop-back communication pathway between said specified first communication pathway and said specified second communication pathway comprises the step of configuring only side stage cross-connect topology between said specified first communication pathway and said specified second communication pathway.
227. A method of establishing a configurable connection between communication pathways as described in claim 225 or any other claim wherein said step of configuring a loop-back communication pathway between said specified first communication pathway and said specified second communication pathway comprises the step of configuring a side stage loop-back interconnect communication pathway between said specified first communication pathway and said specified second communication pathway.
228. A method of establishing a configurable connection between communication pathways as described in claim 227 or any other claim wherein said step of configuring a side stage loop-back interconnect communication pathway between said specified first communication pathway and said specified second communication pathway comprises the step of configuring an outer side stage loop-back interconnect communication pathway between said specified first communication pathway and said specified second communication pathway.
229. A method of establishing a configurable connection between communication pathways as described in claim 225 or any other claim wherein said step of configuring a loop-back communication pathway between said specified first communication pathway and said specified second communication pathway comprises the step of configuring a center stage loop-back interconnect communication pathway between said specified first communication pathway and said specified second communication pathway.
230. A method of establishing a configurable connection between communication pathways as described in claim 202, 225, 227, 228, or 229 or any other claim wherein said step of configuring a loop-back communication pathway between said specified first communication pathway and said specified second communication pathway comprises the step of establishing a partial pathway consumptive loop-back communication pathway between said specified first communication pathway and said specified second communication pathway.
231. A method of establishing a configurable connection between communication pathways as described in claim 230 or any other claim wherein said step of establishing a partial pathway consumptive loop-back communication pathway between said specified first communication pathway and said specified second communication pathway comprises the step of establishing a partial sub array pathway loop-back communication pathway between said specified first communication pathway and said specified second communication pathway.
232. A method of establishing a configurable connection between communication pathways as described in claim 201 or 230 or any other claim wherein said step of configuring a cross-connect topology between said specified first communication pathway and said specified second communication pathway comprises the step of utilizing a truncated throughput interior sub array pathway.
233. A method of establishing a configurable connection between communication pathways as described in claim 232 or any other claim wherein said step of utilizing a truncated throughput interior sub array pathway comprises the step of utilizing a truncated cross sub array pathway.
234. A method of establishing a configurable connection between communication pathways as described in claim 232 or 233 or any other claim wherein said step of utilizing a truncated throughput interior sub array pathway comprises the step of utilizing a truncated forward sub array pathway.

235. A method of establishing a configurable connection between communication pathways as described in claim 232 or any other claim wherein said step of utilizing a truncated throughput interior sub array pathway comprises the step of utilizing a wired-or alternative communication pathway.

236. A method of establishing a configurable connection between communication pathways as described in claim 235 or any other claim wherein said step of utilizing a wired-or alternative communication pathway comprises the step of utilizing a double throw communication pathway.

237. A method of establishing a configurable connection between communication pathways as described in claim 178, 201, or 239 or any other claim and further comprising the step of utilizing at least one interleaved sub array.

238. A method of establishing a configurable connection between communication pathways as described in claim 178, 201, or 239 or any other claim and further comprising the step of utilizing a collective of interleaved center sub arrays.

239. A method of balanced redundancy communication interconnection comprising the steps of:
accepting a first plurality of communication pathways;
accepting a second plurality of communication pathways;
establishing a collective of superfluous capability side stage sub arrays capable of transmitting a communication;
establishing a collective of balanced connectivity side stage sub arrays capable of transmitting a communication;
establishing a collective of center stage sub arrays capable of transmitting a communication; and
configuring at least one of said superfluous capability side stage sub arrays, said balanced connectivity side stage sub arrays, and said center stage sub arrays to communicate between at least one of said first plurality of communication pathways and another communication pathway.

240. A method of balanced redundancy communication interconnection as described in claim 239 or any other claim wherein said step of establishing a collective of superfluous capability side stage sub arrays comprises the step of establishing a collective of superfluous capability outer side stage sub arrays.

241. A method of balanced redundancy communication interconnection as described in claim 240 or any other claim wherein said step of establishing a collective of balanced connectivity side stage sub arrays comprises the step of establishing a collective of balanced connectivity inner side stage sub arrays.

242. A method of balanced redundancy communication interconnection as described in claim 240 or any other claim wherein said step of establishing a collective of superfluous capability side stage sub arrays comprises the step of:
establishing a first collective of superfluous capability side stage sub arrays; and
establishing a second collective of superfluous capability side stage sub arrays.

243. A method of balanced redundancy communication interconnection as described in claim 242 or any other claim wherein said step of establishing a first collective of superfluous capability side stage sub arrays comprises the step of establishing a first stage collective of superfluous capability outer side stage sub arrays, and wherein said step of establishing a second collective of superfluous capability side stage sub arrays comprises the step of establishing a fifth stage collective of superfluous capability outer side stage sub arrays.

244. A method of balanced redundancy communication interconnection as described in claim 240, 242, or 243 or any other claim wherein said step of establishing a collective of balanced connectivity side stage sub arrays comprises the step of:
establishing a first collective of balanced connectivity side stage sub arrays; and
establishing a second collective of balanced connectivity side stage sub arrays.

245. A method of balanced redundancy communication interconnection as described in claim 244 or any other claim wherein said step of establishing a first collective of balanced connectivity side stage sub arrays comprises the step of establishing a second stage collective of balanced connectivity inner side stage sub arrays, and wherein said step of establishing a second collective of balanced connectivity side stage sub arrays comprises the step of establishing a fourth stage collective of balanced connectivity inner side stage sub arrays.

246. A method of balanced redundancy communication interconnection as described in claim 240, 244, or 245 or any other claim wherein said step of establishing a collective of superfluous capability side stage sub arrays comprises the step of establishing a collective of asymmetric side stage sub arrays.

247. A method of balanced redundancy communication interconnection as described in claim 240 or 246 or any other claim wherein said step of establishing collective of balanced connectivity side stage sub arrays comprises the step of establishing a collective of symmetric side stage sub arrays.

248. A method of balanced redundancy communication interconnection as described in claim 240, 241, or 245 or any other claim wherein said step of establishing a collective of superfluous capability side stage sub arrays comprises the step of establishing a collective of single excess increment sub arrays.

249. A method of balanced redundancy communication interconnection as described in claim 247 or 248 or any other claim wherein said step of establishing a collective of balanced connectivity side stage sub arrays comprises the step of establishing a collective of symmetric inner side stage sub arrays.

250. A method of balanced redundancy communication interconnection as described in claim 249 or any other claim wherein said step of establishing a collective of symmetric inner side stage sub arrays comprises the step of establishing a collective of three-by-three inner side stage sub arrays.

251. A method of balanced redundancy communication interconnection as described in claim 240, 248, or 250 or any other claim wherein said step of establishing collective of superfluous capability side stage sub arrays and said step of establishing a collective of balanced connectivity side stage sub arrays each comprise the step of establishing a collective of bilateral sub arrays.

252. A method of balanced redundancy communication interconnection as described in claim 240 or 248 or any other claim wherein said step of establishing a collective of balanced connectivity side stage sub arrays comprises the step of establishing a collective of symmetric bilateral inner side stage sub arrays.

253. A method of balanced redundancy communication interconnection as described in claim 240, 248, or 252 or any other claim wherein said step of establishing a collective of superfluous capability side stage sub arrays comprises the step of establishing a collective of asymmetric bilateral outer side stage sub arrays.

254. A method of balanced redundancy communication interconnection as described in claim 240, 251, 252, or 253 or any other claim wherein said step of establishing collective of center stage sub arrays comprises the step of establishing a collective of quadrilateral center stage sub arrays.

255. A method of balanced redundancy communication interconnection as described in claim 253 or any other claim wherein said step of establishing a collective of center stage sub arrays comprises the step of establishing a collective of symmetric quadrilateral center stage sub arrays.

256. A method of communication interconnection as described in claim 201 or 239 or any other claim wherein said first plurality of communication pathways, each have an individual connection locale, wherein said second plurality of communication pathways, each also have an individual connection locale, and further comprising the step of multiple alternative output switching between any two of said individual connection locales.

257. A method of communication interconnection as described in claim 256 or any other claim and further comprising the step of establishing a fully unconstrained interconnect between said any two of said individual connection locales.

258. A method of communication interconnection as described in claim 257 or any other claim wherein said step of establishing a fully unconstrained interconnect between said any two of said individual connection locales comprises the step of configuring an any-to-any interconnect.

259. A method of communication interconnection as described in claim 258 or any other claim and further comprising the step of any-to-any interconnect switching a collective of sub arrays having at least one multiple alternative output switch capability.

260. A method of communication interconnection as described in claim 259 or any other claim wherein said steps of accepting first and second pluralities of communication pathways comprise the steps of accepting input and output communication pathways and wherein said step of establishing a fully unconstrained interconnect comprises the step of connecting any input and any output to any other pathway.

261. A method of communication interconnection as described in claim 260 or any other claim wherein said step of accepting a first plurality of communication pathways, each having an individual connection locale comprises the step of undesignated locale connecting at least one first communication pathway.

262. A method of communication interconnection as described in claim 261 or any other claim wherein said step of accepting a second plurality of communication pathways, each having an individual connection locale comprises the step of undesignated locale connecting at least one second communication pathway.

263. A method of communication interconnection as described in claim 259 or any other claim wherein said step of multiple alternative output switching between any two of said individual connection locales comprises the step of loop-back switching.

264. A method of communication interconnection as described in claim 256 or 259 or any other claim wherein said step of establishing a fully unconstrained interconnect comprises the step of electrically connecting any two of said individual connection locales.

265. A method of communication interconnection as described in claim 264 or any other claim wherein said step of multiple alternative output switching comprises the step of wired-or switching.

266. A method of communication interconnection as described in claim 257 or any other claim wherein said step of establishing a fully unconstrained interconnect comprises the step of optically connecting any two of said individual connection locales.

267. A method of communication interconnection as described in claim 257 or any other claim wherein said step of establishing a fully unconstrained interconnect comprises the step of signal pathway connecting any two of said individual connection locales.

268. A method of communication interconnection as described in claim 267 or any other claim wherein said step of establishing a fully unconstrained interconnect comprises the step of accommodating a multiple signal pathway.

269. A method of communication interconnection as described in claim 268 or any other claim wherein said step of accommodating a multiple signal pathway comprises the step of accommodating a multiple analog signal pathway.

270. A method of communication interconnection as described in claim 268 or any other claim wherein said step of accommodating a multiple signal pathway comprises the step of accommodating a multiple digital signal pathway.

271. A method of communication interconnection as described in claim 256 or any other claim wherein said step of multiple alternative output switching comprises the step of configuring at least one double throw switch.

272. A method of communication interconnection as described in claim 256 or any other claim wherein said step of multiple alternative output switching comprises the step of permitting an unused switch output.

273. A method of communication interconnection as described in claim 256 or any other claim wherein said step of multiple alternative output switching comprises the step of establishing an alternative pathway between said two individual connection locales.

274. A method of communication interconnection as described in claim 256 or any other claim wherein said step of multiple alternative output switching comprises the step of configuring at least one pair of single throw switches.

275. A method of communication interconnection as described in claim 259 or any other claim wherein said step of any-to-any interconnect switching a collective of sub arrays comprises the step of configuring a plurality of single throw switches.

276. A method of communication interconnection as described in claim 256 or any other claim wherein said step of multiple alternative output switching comprises the step of configuring at least one multiple throw switch.

277. A method of communication interconnection as described in claim 259 or any other claim wherein said step of any-to-any interconnect switching a collective of sub arrays comprises the steps of:
configuring a plurality of double throw switches; and
configuring a plurality of single throw switches.

278. A method of communication interconnection as described in claim 277 or any other claim wherein said step of any-to-any interconnect switching a collective of sub arrays comprises the steps of:
configuring a plurality of exterior sub array double throw switches; and
configuring a plurality of interior sub array single throw switches.
279. A method of communication interconnection as described in claim 259 or any other claim wherein said step of any-to-any interconnect switching a collective of sub arrays comprises the step of configuring a loop-back communication pathway.
280. A method of communication interconnection as described in claim 178 or 239 or any other claim and further comprising the step of determining an interconnect connection location for said specified first communication pathway.
281. A method of communication interconnection as described in claim 280 or any other claim and further comprising the step of configuring a cross-connect topology between said specified first communication pathway and said specified second communication pathway.
282. A method of communication interconnection as described in claim 281 or any other claim wherein said step of connecting at least one specified first communication pathways comprises the step of arbitrarily connecting at least one specified first communication pathways responsive to a cross channel reconfigurable interconnect.
283. A method of communication interconnection as described in claim 282 or any other claim wherein said step of connecting at least one specified second communication pathways comprises the step of arbitrarily connecting at least one specified second communication pathways responsive to a cross channel reconfigurable interconnect.
284. A method of communication interconnection as described in claim 281 or 282 or any other claim and further comprising the step of determining an interconnect connection location for said specified second communication pathway.
285. A method of communication interconnection as described in claim 281 or 284 or any other claim wherein said step of arbitrarily connecting at least one specified first communication pathway responsive to said cross channel reconfigurable interconnect is accomplished before said step of determining an interconnect connection location for said specified first communication pathway.
286. A method of communication interconnection as described in claim 285 or any other claim wherein said step of determining an interconnect connection location for said specified first communication pathway is accomplished before said step of configuring a cross-connect topology between said specified first communication pathway and said specified second communication pathway.
287. A method of communication interconnection as described in claim 284 or any other claim wherein said step of connecting at least one specified second communication pathway responsive to said cross channel reconfigurable interconnect is accomplished before said step of determining an interconnect connection location for said specified second communication pathway.
288. A method of communication interconnection as described in claim 287 or any other claim wherein said step of determining an interconnect connection location for said specified second communication pathway is accomplished before said step of configuring a cross-connect topology between said specified first communication pathway and said specified second communication pathway.
289. A method of communication interconnection as described in claim 286 or 288 or any other claim wherein said step of configuring a cross-connect topology between said specified first communication pathway and said specified second communication pathway comprises the step of electrically connecting said specified first communication pathway and said specified second communication pathway.
290. A method of communication interconnection as described in claim 281, 282, 288 or 289 or any other claim wherein said step of accepting a first plurality of communication pathways comprises the step of accepting a plurality of input communication pathways.
291. A method of communication interconnection as described in claim 281 or 290 wherein said step of accepting a second plurality of communication pathways comprises the step of accepting a plurality of output communication pathways.
292. A method of communication interconnection as described in claim 281 or 282 or any other claim wherein said steps of determining an interconnect connection location for said specified first communication pathway comprises the step of signal testing a communication pathway.
293. A method of communication interconnection as described in claim 284 or any other claim wherein said step of determining an interconnect connection location for said specified second communication pathway comprises the step of signal testing a communication pathway.
294. A method of communication interconnection as described in claim 281 or any other claim wherein said steps of determining an interconnect connection location for said specified first communication pathway comprises the step of utilizing connection documentation data in configuring said cross-connect topology between said specified first communication pathway and said specified second communication pathway.
295. A method of communication interconnection as described in claim 284 or any other claim wherein said step of determining an interconnect connection location for said specified second communication pathway comprises the step of utilizing connection documentation data in configuring said cross-connect topology between said specified first communication pathway and said specified second communication pathway.
296. A method of communication interconnection as described in claim 281, 282, 292 or 293 or any other claim wherein said step of configuring a cross-connect topology between said specified first communication pathway and said specified second communication pathway comprises the step of switching a cross-connect topology between said specified first communication pathway and said specified second communication pathway.
297. A method of communication interconnection as described in claim 281 or 296 or any other claim wherein said step of configuring a cross-connect topology between said specified first communication pathway and said specified second communication pathway comprises the step of automatically configuring a cross-connect topology between said specified first communication pathway and said specified second communication pathway.
298. A method of communication interconnection as described in claim 281 or any other claim wherein said step of configuring a cross-connect topology between said specified first communication pathway and said specified second communication pathway comprises the step of remotely configuring a cross-connect topology between said specified first communication pathway and said specified second communication pathway.

299. A method of communication interconnection as described in claim 281 or any other claim and further comprising the step of reconfiguring a cross-connect topology between said specified first communication pathway and said specified second communication pathway.

300. A method of communication interconnection as described in claim 299 or any other claim wherein said step of reconfiguring a cross-connect topology between said specified first communication pathway and said specified second communication pathway comprises the step of utilizing a redundant configuration cross-connect topology between said specified first communication pathway and said specified second communication pathway.

301. A method of communication interconnection as described in claim 281 or any other claim wherein said step of arbitrarily connecting at least one specified first communication pathway responsive to said cross channel reconfigurable interconnect comprises the step of fully unconstrained selecting a connection location for said at least one specified first communication pathway.

302. A method of communication interconnection as described in claim 282 or 301 or any other claim wherein said step of arbitrarily connecting at least one specified second communication pathway responsive to said cross channel reconfigurable interconnect comprises the step of fully unconstrained selecting a connection location for said at least one specified second communication pathway.

303. A method of communication interconnection as described in claim 281, 282, 292, 293, 296, 301 or 302 or any other claim wherein said step of configuring a cross-connect topology between said specified first communication pathway and said specified second communication pathway comprises the step of configuring a staged cross-connect topology between said specified first communication pathway and said specified second communication pathway.

304. A method of communication interconnection as described in claim 303 or any other claim wherein said step of configuring a staged cross-connect topology between said specified first communication pathway and said specified second communication pathway comprises the step of configuring only side stage cross-connect topology between said specified first communication pathway and said specified second communication pathway.

305. A method of communication interconnection as described in claim 303 or any other claim wherein said step of configuring a staged cross-connect topology between said specified first communication pathway and said specified second communication pathway comprises the step of configuring a center stage loop-back interconnect communication pathway between said specified first communication pathway and said specified second communication pathway.

306. A method of communication interconnection as described in claim 281, 282, 292, 293, 296, 301, 302, or 303 or any other claim wherein said step of configuring a cross-connect topology between said specified first communication pathway and said specified second communication pathway comprises the step of configuring a loop-back communication pathway between said specified first communication pathway and said specified second communication pathway.

307. A method of communication interconnection as described in claim 306 or any other claim wherein said step of configuring a loop-back communication pathway between said specified first communication pathway and said specified second communication pathway comprises the step of configuring only side stage cross-connect topology between said specified first communication pathway and said specified second communication pathway.

308. A method of communication interconnection as described in claim 306 or any other claim wherein said step of configuring a loop-back communication pathway between said specified first communication pathway and said specified second communication pathway comprises the step of configuring a side stage loop-back interconnect communication pathway between said specified first communication pathway and said specified second communication pathway.

309. A method of communication interconnection as described in claim 308 or any other claim wherein said step of configuring a side stage loop-back interconnect communication pathway between said specified first communication pathway and said specified second communication pathway comprises the step of configuring an outer side stage loop-back interconnect communication pathway between said specified first communication pathway and said specified second communication pathway.

310. A method of communication interconnection as described in claim 306 or any other claim wherein said step of configuring a loop-back communication pathway between said specified first communication pathway and said specified second communication pathway comprises the step of configuring a center stage loop-back interconnect communication pathway between said specified first communication pathway and said specified second communication pathway.

311. A method of communication interconnection as described in claim 303, 306, 308, 309, or 310 or any other claim wherein said step of configuring a loop-back communication pathway between said specified first communication pathway and said specified second communication pathway comprises the step of establishing a partial pathway consumptive loop-back communication pathway between said specified first communication pathway and said specified second communication pathway.

312. A method of communication interconnection as described in claim 311 or any other claim wherein said step of establishing a partial pathway consumptive loop-back communication pathway between said specified first communication pathway and said specified second communication pathway comprises the step of establishing a partial sub array pathway loop-back communication pathway between said specified first communication pathway and said specified second communication pathway.

313. A method of communication interconnection as described in claim 281 or 311 or any other claim wherein said step of configuring a cross-connect topology between said specified first communication pathway and said specified second communication pathway comprises the step of utilizing a truncated throughput interior sub array pathway.

314. A method of communication interconnection as described in claim 313 or any other claim wherein said step of utilizing a truncated throughput interior sub array pathway comprises the step of utilizing a truncated cross sub array pathway.

315. A method of communication interconnection as described in claim 313 or 314 or any other claim wherein said step of utilizing a truncated throughput interior sub array pathway comprises the step of utilizing a truncated forward sub array pathway.

316. A method of communication interconnection as described in claim 313 or any other claim wherein said step of utilizing a truncated throughput interior sub array pathway comprises the step of utilizing a wired-or alternative communication pathway.

317. A method of communication interconnection as described in claim 316 or any other claim wherein said step of utilizing a wired-or alternative communication pathway comprises the step of utilizing a double throw communication pathway.

318. A method of communication interconnection as described in claim 178, 201, or 239 or any other claim and further comprising the step of utilizing at least one interleaved sub array.

319. A method of communication interconnection as described in claim 178, 201, or 239 or any other claim and further comprising the step of utilizing a collective of interleaved center sub arrays.

320. A method of communication interconnection as described in claim 178 or 201 or any other claim and further comprising the steps of:
establishing a collective of superfluous capability side stage sub arrays capable of transmitting a communication;
establishing a collective of balanced connectivity side stage sub arrays capable of transmitting a communication;
establishing a collective of center stage sub arrays capable of transmitting a communication; and
configuring at least one of said superfluous capability side stage sub arrays, said balanced connectivity side stage sub arrays, and said center stage sub arrays to communicate between at least one of said first plurality of communication pathways and another communication pathway.

321. A method of communication interconnection as described in claim 320 or any other claim wherein said step of establishing a collective of superfluous capability side stage sub arrays comprises the step of establishing a collective of superfluous capability outer side stage sub arrays.

322. A method of communication interconnection as described in claim 321 or any other claim wherein said step of establishing a collective of balanced connectivity side stage sub arrays comprises the step of establishing a collective of balanced connectivity inner side stage sub arrays.

323. A method of communication interconnection as described in claim 320 or any other claim wherein said step of establishing a collective of superfluous capability side stage sub arrays comprises the step of:
establishing a first collective of superfluous capability side stage sub arrays; and
establishing a second collective of superfluous capability side stage sub arrays.

324. A method of communication interconnection as described in claim 323 or any other claim wherein said step of establishing a first collective of superfluous capability side stage sub arrays comprises the step of establishing a first stage collective of superfluous capability outer side stage sub arrays, and wherein said step of establishing a second collective of superfluous capability side stage sub arrays comprises the step of establishing a fifth stage collective of superfluous capability outer side stage sub arrays.

325. A method of communication interconnection as described in claim 320, 323, or 324 or any other claim wherein said step of establishing a collective of balanced connectivity side stage sub arrays comprises the step of:
establishing a first collective of balanced connectivity side stage sub arrays; and
establishing a second collective of balanced connectivity side stage sub arrays.

326. A method of communication interconnection as described in claim 325 or any other claim wherein said step of establishing a first collective of balanced connectivity side stage sub arrays comprises the step of establishing a second stage collective of balanced connectivity inner side stage sub arrays, and wherein said step of establishing a second collective of balanced connectivity side stage sub arrays comprises the step of establishing a fourth stage collective of balanced connectivity inner side stage sub arrays.

327. A method of communication interconnection as described in claim 320, 325, or 326 or any other claim wherein said step of establishing a collective of superfluous capability side stage sub arrays comprises the step of establishing a collective of asymmetric side stage sub arrays.

328. A method of communication interconnection as described in claim 320 or 327 or any other claim wherein said step of establishing collective of balanced connectivity side stage sub arrays comprises the step of establishing a collective of symmetric side stage sub arrays.

329. A method of communication interconnection as described in claim 320, 322, or 326 or any other claim wherein said step of establishing a collective of superfluous capability side stage sub arrays comprises the step of establishing a collective of single excess increment sub arrays.

330. A method of communication interconnection as described in claim 328 or 329 or any other claim wherein said step of establishing a collective of balanced connectivity side stage sub arrays comprises the step of establishing a collective of symmetric inner side stage sub arrays.

331. A method of communication interconnection as described in claim 330 or any other claim wherein said step of establishing a collective of symmetric inner side stage sub arrays comprises the step of establishing a collective of three-by-three inner side stage sub arrays.

332. A method of communication interconnection as described in claim 320, 329, or 331 or any other claim wherein said step of establishing collective of superfluous capability side stage sub arrays and said step of establishing a collective of balanced connectivity side stage sub arrays each comprise the step of establishing a collective of bilateral sub arrays.

333. A method of communication interconnection as described in claim 320 or 329 or any other claim wherein said step of establishing a collective of balanced connectivity side stage sub arrays comprises the step of establishing a collective of symmetric bilateral inner side stage sub arrays.

334. A method of communication interconnection as described in claim 320, 329, or 333 or any other claim wherein said step of establishing a collective of superfluous capability side stage sub arrays comprises the step of establishing a collective of asymmetric bilateral outer side stage sub arrays.

335. A method of communication interconnection as described in claim 320, 332, 333, or 334 or any other claim wherein said step of establishing collective of center stage sub arrays comprises the step of establishing a collective of quadrilateral center stage sub arrays.

336. A method of communication interconnection as described in claim 334 or any other claim wherein said step of establishing a collective of center stage sub arrays comprises the step of establishing a collective of symmetric quadrilateral center stage sub arrays.

337. A method of communication interconnection as described in claim 178 or 201 or 239 or any other claim and further comprising the step of establishing a collective of three-by-three connectivity side stage sub arrays.

338. A method of communication interconnection as described in claim 337 or any other claim and further comprising the step of establishing a collective of three-by-four connectivity side stage sub arrays.

339. A method of communication interconnection as described in claim 337 or 338 or any other claim and further comprising the steps of:
establishing a collective of side stage sub arrays having a side connectivity size; and
establishing a collective of larger connectivity center stage sub arrays having a center connectivity size that is larger than said side connectivity size.

340. A method of communication interconnection as described in claim 178 or 201 or 239 or any other claim and further comprising the step of establishing a collective of integer averaged natural logarithm based connectivity side stage sub arrays.

341. A method of communication interconnection as described in claim 178 or 201 or 239 or any other claim and further comprising the steps of:
establishing a collective of side stage sub arrays having a side connectivity size; and
establishing a collective of larger connectivity center stage sub arrays having a center connectivity size that is larger than said side connectivity size.

342. A method of communication interconnection as described in claim 178 or 201 or 239 or any other claim and further comprising the step of establishing a collective of six-by-six connectivity center stage sub arrays.

343. A method of communication interconnection as described in claim 342 or any other claim and further comprising the step of establishing a collective of three-by-four connectivity side stage sub arrays.

344. A method of communication interconnection as described in claim 342 or 343 or any other claim and further comprising the steps of:
establishing a collective of side stage sub arrays having a side connectivity size; and
establishing a collective of larger connectivity center stage sub arrays having a center connectivity size that is larger than said side connectivity size.

345. A method of communication interconnection as described in claim 178 or 201 or 239 or any other claim and further comprising the step of establishing a collective of twelve-by-twelve connectivity center stage sub arrays.

346. A method of communication interconnection as described in claim 345 or any other claim and further comprising the step of establishing a collective of three-by-four connectivity side stage sub arrays.

347. A method of communication interconnection as described in claim 345 or 346 or any other claim and further comprising the steps of:
establishing a collective of side stage sub arrays having a side connectivity size; and
establishing a collective of larger connectivity center stage sub arrays having a center connectivity size that is larger than said side connectivity size.

348. A method of communication interconnection as described in claim 178 or 201 or 239 or any other claim and further comprising the step of establishing a collective of exterior sub array multiple alternative output switch capabilities.

349. A method of communication interconnection as described in claim 178 or 201 or 239 or any other claim and further comprising the step of establishing a collective of quadrilateral center stage sub arrays.

350. A method of communication interconnection as described in claim 349 or any other claim and further comprising the step of establishing a collective of bilateral side stage sub arrays.

351. A method of communication interconnection as described in claim 178, 201, 239, or 350 or any other claim and further comprising the step of establishing a collective of staged sub arrays.

352. A method of communication interconnection as described in claim 178, 201, 239, or 350 or any other claim and further comprising the step of establishing a collective of modular sub arrays.

353. A method of communication interconnection as described in claim 352 or any other claim and further comprising the step of establishing a collective of three-by-three connectivity side stage sub arrays.

354. A method of communication interconnection as described in claim 352 or any other claim and further comprising the step of establishing a collective of three-by-four connectivity side stage sub arrays.

355. A method of communication interconnection as described in claim 352 or 354 or any other claim and further comprising the steps of:
establishing a collective of side stage sub arrays having a side connectivity size; and
establishing a collective of larger connectivity center stage sub arrays having a center connectivity size that is larger than said side connectivity size.

356. A method of communication interconnection as described in claim 352 or 355 or any other claim and further comprising the step of establishing a collective of six-by-six connectivity center stage sub arrays.

357. A method of communication interconnection as described in claim 352 or 355 or any other claim and further comprising the step of establishing a collective of twelve-by-twelve connectivity center stage sub arrays.

358. A method of communication interconnection as described in claim 178 or 201 or 239 or any other claim and further comprising the step of configuring a loop-back communication pathway between a specified first communication pathway and a specified second communication pathway.

359. A method of communication interconnection as described in claim 358 or any other claim wherein said step of configuring a loop-back communication pathway between said specified first communication pathway and said specified second communication pathway comprises the step of configuring only side stage cross-connect topology between said specified first communication pathway and said specified second communication pathway.

360. A method of communication interconnection as described in claim 358 or any other claim wherein said step of configuring a loop-back communication pathway between said specified first communication pathway and said specified second communication pathway comprises the step of configuring a side stage loop-back interconnect communication pathway between said specified first communication pathway and said specified second communication pathway.

361. A method of communication interconnection as described in claim 360 or any other claim wherein said step of configuring a side stage loop-back interconnect communication pathway between said specified first communication pathway and said specified second communication pathway comprises the step of configuring an outer side stage loop-back interconnect communication pathway between said specified first communication pathway and said specified second communication pathway.

362. A method of communication interconnection as described in claim 358 or any other claim wherein said step of configuring a loop-back communication pathway between said specified first communication pathway and said specified second communication pathway comprises the step of configuring a center stage loop-back interconnect communication pathway between said specified first communication pathway and said specified second communication pathway.

363. A method of communication interconnection as described in claim 358, 360, 361, or 362 or any other claim wherein said step of configuring a loop-back communication pathway between said specified first communication pathway and said specified second communication pathway comprises the step of establishing a partial pathway consumptive loop-back communication pathway between said specified first communication pathway and said specified second communication pathway.

364. A method of communication interconnection as described in claim 363 or any other claim wherein said step of establishing a partial pathway consumptive loop-back communication pathway between said specified first communication pathway and said specified second communication pathway comprises the step of establishing a partial sub array pathway loop-back communication pathway between said specified first communication pathway and said specified second communication pathway.

365. A method of communication interconnection as described in claim 363 or any other claim wherein said step of configuring a cross-connect topology between said specified first communication pathway and said specified second communication pathway comprises the step of utilizing a truncated throughput interior sub array pathway.

366. A method of communication interconnection as described in claim 365 or any other claim wherein said step of utilizing a truncated throughput interior sub array pathway comprises the step of utilizing a truncated cross sub array pathway.

367. A method of communication interconnection as described in claim 365 or 366 or any other claim wherein said step of utilizing a truncated throughput interior sub array pathway comprises the step of utilizing a truncated forward sub array pathway.

368. A method of communication interconnection as described in claim 365 or any other claim wherein said step of utilizing a truncated throughput interior sub array pathway comprises the step of utilizing a wired-or alternative communication pathway.

369. A method of communication interconnection as described in claim 368 or any other claim wherein said step of utilizing a wired-or alternative communication pathway comprises the step of utilizing a double throw communication pathway.

370. A method of communication interconnection as described in claim 178, 201, or 239 or any other claim and further comprising the step of utilizing at least one interleaved sub array.

371. A method of communication interconnection as described in claim 178, 201, or 239 or any other claim and further comprising the step of utilizing at least one interleaved center sub array.

372. A method of communication interconnection as described in claim 178, 201, or 239 or any other claim and further comprising the step of utilizing a resource-efficient interconnect.

373. A method of communication interconnection as described in claim 372 or any other claim wherein said resource-efficient interconnect has a plurality of switch capabilities, a plurality of input-capable connection locales, and a plurality of output-capable connection locales, and having resource efficiency selected from a group consisting of:
the number of switch capabilities being less than about two percent of an input-output product value for said interconnect,
the number of switch capabilities being less than about two percent of an input-output product value for an interconnect having a similar input-output product value,
the number of switch capabilities being less than about two percent of an input-output product value of greater than about twenty thousand for said interconnect,
the number of switch capabilities being less than about two percent of an input-output product value for a multi stage interconnect,
the number of switch capabilities being less than about two percent of an input-output product value of greater than about twenty thousand for a fifteen stage interconnect,
the number of switch capabilities being less than about one percent of an input-output product value for said interconnect,
the number of switch capabilities being less than about one percent of an input-output product value for an interconnect having a similar input-output product value,
the number of switch capabilities being less than about one percent of an input-output product value of greater than about twenty thousand for said interconnect,
the number of switch capabilities being less than about one percent of an input-output product value for a multi stage interconnect,
the number of switch capabilities being less than about one percent of an input-output product value of greater than about twenty thousand for a fifteen stage interconnect,
the number of switch capabilities being less than about one-half percent of an input-output product value for said interconnect,
the number of switch capabilities being less than about one-half percent of an input-output product value for an interconnect having a similar input-output product value,
the number of switch capabilities being less than about one-half percent of an input-output product value of greater than about twenty thousand for said interconnect,
the number of switch capabilities being less than about one-half percent of an input-output product value for a multi stage interconnect,
the number of switch capabilities being less than about one-half percent of an input-output product value of greater than about twenty thousand for a fifteen stage interconnect,
the number of switch capabilities being less than about three tenths percent of an input-output product value for said interconnect, the number of switch capabilities being less than about three tenths percent of an input-output product value for an interconnect having a similar input-output product value, the number of switch capabilities being less than about three tenths percent of an input-output product value of greater than about twenty thousand for said interconnect, the number of switch capabilities being less than about three tenths percent of an input-output product value for a multi stage interconnect, the number of switch capabilities being less than about three tenths percent of an input-output product value of greater than about twenty thousand for a fifteen stage interconnect, better than a traditional network switch capability to input-output product value efficiency, better than a Clos network switch capability to input-output product value efficiency, better than a Benes network switch capability to input-output product value efficiency, better than a traditional network switch capability to input-output product value efficiency for an interconnect having a similar input-output product value, better than a Clos network switch capability to input-output product value efficiency for an interconnect having a similar input-output product value, better than a Benes network switch capability to input-output product value efficiency for an interconnect having a similar input-output product value, a resource efficiency ratio that is greater than about two for a traditional network switch capability input-output product efficiency value, a resource efficiency ratio that is greater than about two for a Clos network switch capability input-output product efficiency value, and a resource efficiency ratio that is greater than about two for a Benes network switch capability input-output product efficiency value.

374. A method of communication interconnection as described in claim 178, 201, or 239 or any other claim and further comprising the steps of:
establishing an initial interconnect topology for said first communication pathway;
determining an alternative interconnect topology for said first communication pathway; and then
substantially simultaneously disconnecting said initial interconnect topology for said first communication pathway and establishing said alternative interconnect topology for said first communication pathway; and thereafter
utilizing said alternative interconnect topology for said first communication pathway.

375. A method of communication interconnection as described in claim 374 or any other claim wherein said steps of establishing an initial interconnect topology and establishing said alternative interconnect topology comprise the steps of:
utilizing at least one superfluous capability side stage sub array; and
utilizing at least one balanced connectivity side stage sub array.

376. A method of communication interconnection as described in claim 375 or any other claim and further comprising the step of establishing a collective of three-by-three connectivity side stage sub arrays.

377. A method of communication interconnection as described in claim 376 or any other claim and further comprising the step of establishing a collective of three-by-four connectivity side stage sub arrays.

378. A method of communication interconnection as described in claim 377 or any other claim and further comprising the steps of:
establishing a collective of side stage sub arrays having a side connectivity size; and
establishing a collective of larger connectivity center stage sub arrays having a center connectivity size that is larger than said side connectivity size.

The invention claimed is:

1. A method of hardware efficient communication interconnection comprising the steps of:
accepting a first plurality of communication pathways, each having an individual connection locale;
accepting a second plurality of communication pathways, each also having an individual connection locale;
multiple alternative output switching between any two of said individual connection locales; and
establishing a fully unconstrained interconnect between said any two of said individual connection locales;
and further comprising the steps of:
establishing a collective of superfluous capability side stage sub arrays capable of transmitting a communication;
establishing a collective of balanced connectivity side stage sub arrays capable of transmitting a communication;
establishing a collective of center stage sub arrays capable of transmitting a communication; and
configuring at least one of said superfluous capability side stage sub arrays, said balanced connectivity side stage sub arrays, and said center stage sub arrays to communicate between at least one of said first plurality of communication pathways and another communication pathway;
and wherein said step of establishing a collective of superfluous capability side stage sub arrays comprises the step of establishing a collective of superfluous capability outer side stage sub arrays.

2. A method of establishing a configurable connection between communication pathways comprising the steps of:
accepting a first plurality of communication pathways;
establishing a cross channel reconfigurable interconnect having a plurality of cross channel pathway connections;
accepting a second plurality of communication pathways;
arbitrarily connecting at least one specified first communication pathway responsive to said cross channel reconfigurable interconnect;
connecting at least one specified second communication pathway responsive to said cross channel reconfigurable interconnect;
determining an interconnect connection location for said specified first communication pathway;
configuring a cross-connect topology between said specified first communication pathway and said specified second communication pathway;
communicating between said specified first communication pathway and said specified second communication pathway;
and further comprising the steps of:
establishing a collective of superfluous capability side stage sub arrays capable of transmitting a communication;

establishing a collective of balanced connectivity side stage sub arrays capable of transmitting a communication;

establishing a collective of center stage sub arrays capable of transmitting a communication; and configuring at least one of said superfluous capability side stage sub arrays, said balanced connectivity side stage sub arrays, and said center stage sub arrays to communicate between at least one of said first plurality of communication pathways and another communication pathway;

and wherein said step of establishing a collective of superfluous capability side stage sub arrays comprises the step of establishing a collective of superfluous capability outer side stage sub arrays.

3. A method of balanced redundancy hardware efficient communication interconnection comprising the steps of:

accepting a first plurality of communication pathways, each having an individual connection locale;

accepting a second plurality of communication pathways, each also having an individual connection locale;

multiple alternative output switching between any two of said individual connection locales;

establishing a fully unconstrained interconnect between said any two of said individual connection locales;

establishing a collective of superfluous capability side stage sub arrays capable of transmitting a communication;

establishing a collective of balanced connectivity side stage sub arrays capable of transmitting a communication;

establishing a collective of center stage sub arrays capable of transmitting a communication; and configuring at least one of said superfluous capability side stage sub arrays, said balanced connectivity side stage sub arrays, and said center stage sub arrays to communicate between at least one of said first plurality of communication pathways and another communication pathway.

4. A method of hardware efficient communication interconnection as described in claim 1 wherein said step of establishing a fully unconstrained interconnect between said any two of said individual connection locales comprises the step of configuring an any-to-any interconnect.

5. A method of hardware efficient communication interconnection as described in claim 4 wherein said steps of accepting first and second pluralities of communication pathways comprise the steps of accepting input and output communication pathways and wherein said step of establishing a fully unconstrained interconnect comprises the step of connecting any input and any output to any other pathway.

6. A method of hardware efficient communication interconnection as described in claim 4 wherein said step of multiple alternative output switching between any two of said individual connection locales comprises the step of loop-back switching.

7. A method of hardware efficient communication interconnection as described in claim 4 and further comprising the step of any-to-any interconnect switching a collective of sub arrays having at least one multiple alternative output switch capability, wherein said step of any-to-any interconnect switching a collective of sub arrays comprises the steps of:

configuring a plurality of double throw switches; and
configuring a plurality of single throw switches.

8. A method of hardware efficient communication interconnection as described in claim 7 wherein said step of any-to-any interconnect switching a collective of sub arrays comprises the steps of:

configuring a plurality of exterior sub array double throw switches; and configuring a plurality of interior sub array single throw switches.

9. A method of hardware efficient communication interconnection as described in claim 1 wherein said step of establishing a fully unconstrained interconnect comprises the step of electrically connecting any two of said individual connection locales.

10. A method of hardware efficient communication interconnection as described in claim 1 wherein said step of establishing a fully unconstrained interconnect comprises the step of signal pathway connecting any two of said individual connection locales.

11. A method of hardware efficient communication interconnection as described in claim 10 wherein said step of establishing a fully unconstrained interconnect comprises the step of accommodating a multiple signal pathway.

12. A method of hardware efficient communication interconnection as described in claim 11 wherein said step of accommodating a multiple signal pathway comprises the step of accommodating a multiple digital signal pathway.

13. A method of hardware efficient communication interconnection as described in claim 1 wherein said step of multiple alternative output switching comprises the step of configuring at least one double throw switch.

14. A method of hardware efficient communication interconnection as described in claim 1 wherein said step of multiple alternative output switching comprises the step of configuring at least one pair of single throw switches.

15. A method of hardware efficient communication interconnection as described in claim 1 wherein said step of multiple alternative output switching comprises the step of configuring at least one multiple throw switch.

16. A method of communication interconnection as described in claim 1 or 2 wherein said step of establishing a collective of balanced connectivity side stage sub arrays comprises the step of establishing a collective of balanced connectivity inner side stage sub arrays.

17. A method of communication interconnection as described in claim 1 or 2 wherein said step of establishing collective of balanced connectivity side stage sub arrays comprises the step of establishing a collective of symmetric side stage sub arrays.

18. A method of communication interconnection as described in claim 1 or 2 wherein said step of establishing a collective of superfluous capability side stage sub arrays comprises the step of establishing a collective of single excess increment sub arrays.

19. A method of communication interconnection as described in claim 18 wherein said step of establishing a collective of balanced connectivity side stage sub arrays comprises the step of establishing a collective of symmetric inner side stage sub arrays.

20. A method of communication interconnection as described in claim 19 wherein said step of establishing a collective of symmetric inner side stage sub arrays comprises the step of establishing a collective of three-by-three inner side stage sub arrays.

21. A method of communication interconnection as described in claim 1 or 2 wherein said step of establishing a collective of balanced connectivity side stage sub arrays comprises the step of establishing a collective of symmetric bilateral inner side stage sub arrays.

22. A method of communication interconnection as described in claim 1 or 2 wherein said step of establishing a collective of superfluous capability side stage sub arrays comprises the step of establishing a collective of asymmetric bilateral outer side stage sub arrays.

23. A method of communication interconnection as described in claim 22 wherein said step of establishing a collective of center stage sub arrays comprises the step of establishing a collective of symmetric quadrilateral center stage sub arrays.

24. A method of communication interconnection as described in claim 1 or 2 wherein said step of establishing collective of center stage sub arrays comprises the step of establishing a collective of quadrilateral center stage sub arrays.

25. A method of communication interconnection as described in claim 1 or 2 or 3 and further comprising the step of establishing a collective of three-by-three connectivity side stage sub arrays.

26. A method of communication interconnection as described in claim 25 and further comprising the step of establishing a collective of three-by-four connectivity side stage sub arrays.

27. A method of communication interconnection as described in claim 25 and further comprising the steps of:
establishing a collective of side stage sub arrays having a side connectivity size; and
establishing a collective of larger connectivity center stage sub arrays having a center connectivity size that is larger than said side connectivity size.

28. A method of communication interconnection as described in claim 1 or 2 or 3 and further comprising the step of configuring a loop-back communication pathway between a specified first communication pathway and a specified second communication pathway.

29. A method of communication interconnection as described in claim 1, 2, or 3 and further comprising the step of utilizing at least one interleaved sub array.

30. A method of communication interconnection as described in claim 1, 2, or 3 and further comprising the step of utilizing at least one interleaved center sub array.

31. A method of communication interconnection as described in claim 1, 2, or 3 and further comprising the steps of:
establishing an initial interconnect topology for said first communication pathway;
determining an alternative interconnect topology for said first communication pathway; and then
substantially simultaneously disconnecting said initial interconnect topology for said first communication pathway and establishing said alternative interconnect topology for said first communication pathway; and thereafter
utilizing said alternative interconnect topology for said first communication pathway.

32. A method of communication interconnection as described in claim 2 wherein said first plurality of communication pathways, each have an individual connection locale, wherein said second plurality of communication pathways, each also have an individual connection locale, and further comprising the step of multiple alternative output switching between any two of said individual connection locales.

33. A method of balanced redundancy hardware efficient communication interconnection as described in claim 3 wherein said step of establishing a collective of superfluous capability side stage sub arrays comprises the step of establishing a collective of asymmetric side stage sub arrays.

34. A method of balanced redundancy hardware efficient communication interconnection as described in claim 33 wherein said step of establishing collective of balanced connectivity side stage sub arrays comprises the step of establishing a collective of symmetric side stage sub arrays.

35. A method of communication interconnection as described in claim 3 or claim 32 and further comprising the step of establishing a fully unconstrained interconnect between said any two of said individual connection locales.

36. A method of communication interconnection as described in claim 35 wherein said step of establishing a fully unconstrained interconnect between said any two of said individual connection locales comprises the step of configuring an any-to-any interconnect.

37. A method of communication interconnection as described in claim 35 wherein said step of multiple alternative output switching between any two of said individual connection locales comprises the step of loop-back switching.

38. A method of communication interconnection as described in claim 3, further comprising the step of determining an interconnect connection location for a specified first communication pathway, and further comprising the step of configuring a cross-connect topology between said specified first communication pathway and a specified second communication pathway, wherein said step of configuring a cross-connect topology between said specified first communication pathway and said specified second communication pathway comprises the step of automatically configuring a cross-connect topology between said specified first communication pathway and said specified second communication pathway.

* * * * *